United States Patent [19]

Okuda et al.

[11] Patent Number: 4,754,322

[45] Date of Patent: Jun. 28, 1988

[54] YC-SIGNAL SEPARATION CIRCUIT RESPONSIVE TO MAGNITUDE OF VERTICAL CORRELATION

[75] Inventors: Akihide Okuda; Isao Nakagawa; Masato Sugiyama; Kenji Katsumata, all of Yokohama, Japan

[73] Assignee: Hitachi, Ltd., Tokyo, Japan

[21] Appl. No.: 908,669

[22] Filed: Sep. 17, 1986

[30] Foreign Application Priority Data

Sep. 30, 1985 [JP] Japan .................................. 60-215010
Sep. 30, 1985 [JP] Japan .................................. 60-215011
Sep. 30, 1985 [JP] Japan .................................. 60-215012

[51] Int. Cl.$^4$ .............................................. H04N 9/78
[52] U.S. Cl. ........................................ 358/31; 358/37
[58] Field of Search ............................... 358/31/36, 37

[56] References Cited

U.S. PATENT DOCUMENTS

| 4,050,084 | 9/1977 | Rossi ...................................... 358/31 |
| 4,179,705 | 12/1979 | Faroudja ................................ 358/31 |
| 4,389,665 | 6/1983 | Nagao et al. ........................... 358/23 |
| 4,626,895 | 12/1986 | Reitmeier .............................. 358/31 |
| 4,638,351 | 1/1987 | Clarke .................................... 358/31 |
| 4,656,501 | 4/1987 | Casey et al. ........................... 358/31 |

FOREIGN PATENT DOCUMENTS 58115995 9/1983 Japan .
6019365 1/1985 Japan .

*Primary Examiner*—James J. Groody
*Assistant Examiner*—Robert M. Bauer
*Attorney, Agent, or Firm*—Antonelli, Terry & Wands

OTHER PUBLICATIONS

"Extended Definition TU Fully Compatible w/Existing Standards", Fukinuki & Hirano, IEEE Trans. on Communications, Vol. 32, No. 8, August 1984.
"A Motion-Compensated Interframe Coding Scheme for Television Pictures", Ninomiya & Ohtsuka, IEEE Trans. on Communications, Vol. 30, No. 1, January 1982.

[57] ABSTRACT

The present invention is for separating luminance signal Y and color difference signal C from the composite color television signal and includes a frame memory for storing the composite color television signal, a motion detector for detecting motion of a picture image on the basis of the signal read out from the frame memory, a correlation detector for detecting the magnitude of vertical correlation of pictures on the basis of the signal read out from the frame memory, a vertical-axis filter for performing YC-signal separation through a filtering operation in the vertical-axis direction, a time-axis filter for performing a filtering operation in the time-axis direction, a two-dimensional filter for performing YC-signal separation through a filtering operation in both the horizontal and vertical directions, and a mixer for mixing the outputs of the three filters in accordance with the magnitude of motion and the magnitude of vertical correlation.

9 Claims, 24 Drawing Sheets

XVH = CVH OR YVH
XV = CV OR YV
XT = CT OR YT
X = C OR Y

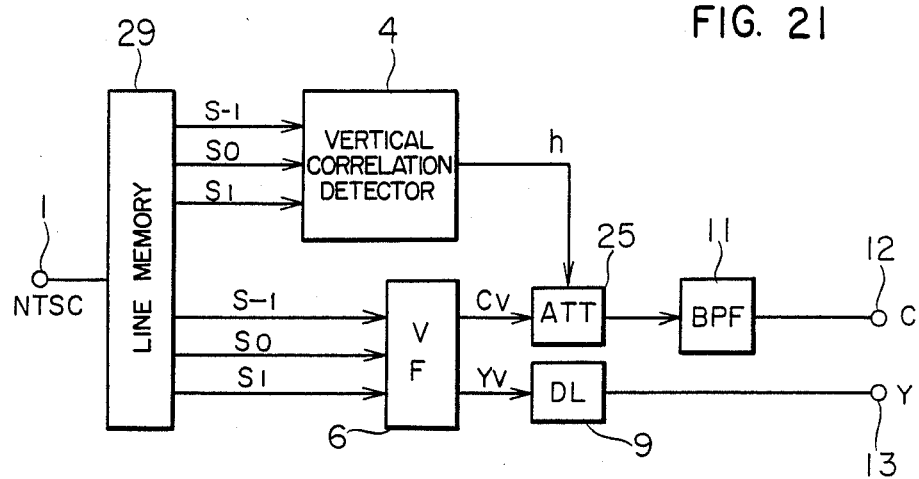
FIG. 21
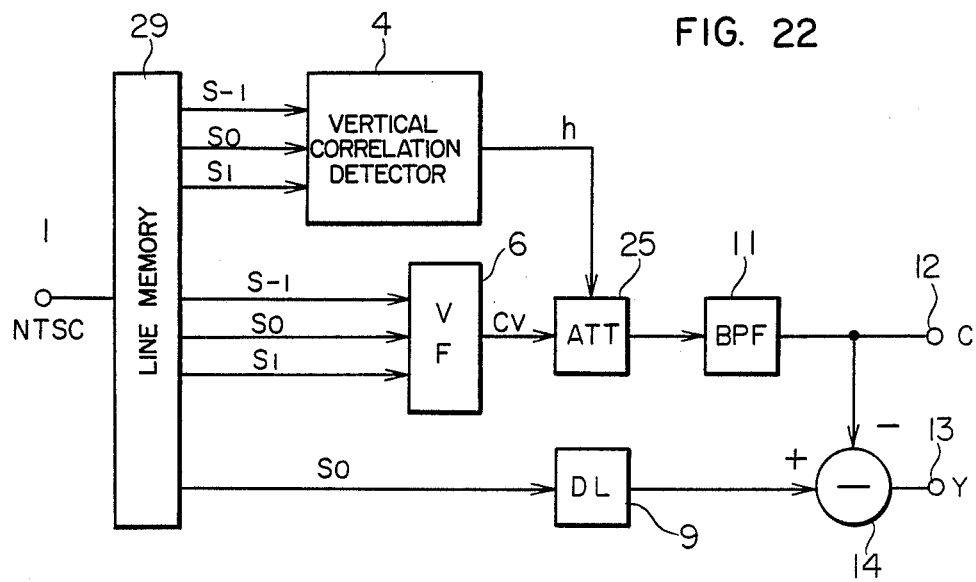
FIG. 22
FIG. 23
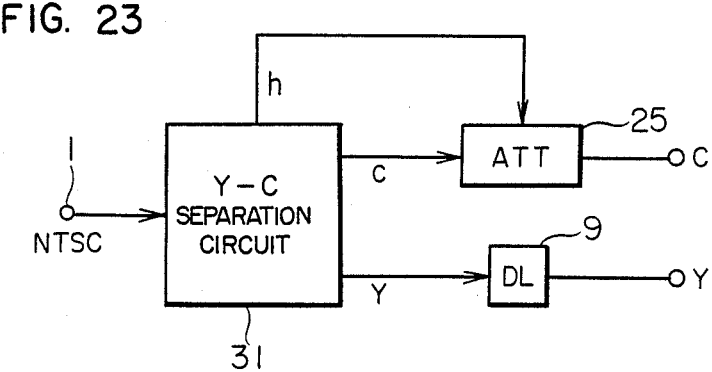

YC-SIGNAL SEPARATION CIRCUIT RESPONSIVE TO MAGNITUDE OF VERTICAL CORRELATION

BACKGROUND OF THE INVENTION

The present invention relates to a signal processing circuit for a composite color television signal such as NTSC system, and in particular concerns a YC-signal separation circuit and an enhancement circuit of the motion adaptive type.

Studies and development of digital televisions in an effort to realize a high image quality and high performance by making use of semiconductor memories and digital signal processing techniques are in full flourish. In the signal processing in such digital television technology, the YC-signal separation (i.e. separation of luminance and color difference signals Y and C) plays an important role. An example of the hitherto known YC-signal separation processings is disclosed in Japanese Patent Application Laid-Open No. 115995/1983 (JP-A-58-115995). According to this known technique, motion of a picture is detected by writing and reading the television signal in and from a frame memory to thereby determine whether the picture in concern is a still picture or a motion picture. In a case of the still picture, the YC-signal separation is performed by making use of an inter-frame correlation, while for a motion picture the YC-signal separation is carried out by making use of an inter-line correlation (vertical correlation). However, in the YC-signal separation circuit disclosed in the above mentioned publication (JP-A-No. 58-115995), no consideration is paid to the cross-talk taking place between the Y-signal and the C-signal upon the signal separation being carried out for a motion picture having no vertical correlation.

It is further noted that in the hitherto known television apparatus, image quality undergoes degradation resulting from disturbances such as cross-color phenomenon, dot interference and interlacing interference. In recent years, numerous and various approaches have been made for developing digital televisions in which adaptive YC-signal separation, adaptive scanning line interpolation and enhancement are performed by making use of a frame memory and advanced digital signal processing with the aim for realizing reproduction of a high quality image by eliminating the aforementioned disturbance factors which bring about degradation in the image quality. The enhancement processing is performed for realizing a high image resolution. However, the hitherto known enhancement techniques suffer problems that realization of high image resolution is accompanied with occurrence interlacing interference and dot interference of considerable magnitude.

The problems of the hitherto known enhancement technique will be discussed below in some detail by taking as an example an NTSC color television signal. First, description is directed to a horizontal enhancement circuit. The YC-signal separation of the motion adaptive type is accomplished by changing over the filtering operation with respect to the directions corresponding to the time axis, vertical axis and the horizontal axis, respectively. More specifically, in the case of a still picture, the YC-signal separation can be realized by using a time-axis filter without any accompanying cross-talk. In the case of a motion picture having a vertical correlation, the YC-signal separation can be effectuated by using a vertical-axis filter without any accompanying cross-talk. However, in the case of a motion picture exhibiting no vertical correlation, the YC-signal separation cannot be carried out without being accompanied with cross-talk between different filters. The hitherto known enhancement circuit is so designed that the gain is increased in the high frequency range of the luminance signal Y (e.g. in the vicinity of 3.58 MHz) independent of whether a motion or a still picture is to be processed or whether or not vertical correlation is present. Consequently, the high resolution is necessarily accompanied with significant dot interference. A vertical enhancement circuit will be considered. According to the adaptive scanning line interpolation, the processings performed by the time-axis filter and the vertical-axis filter are changed over to remove the fly-back signal in the interlaced scanning which lies in a frequency space (30 Hz, 525 lines). FIG. 29 of the accompanying drawings illustrates an interpolation processing for a still picture, FIG. 30 illustrates an interpolation processing for a motion picture having a vertical correlation, and FIG. 31 illustrates an interpolation processing for a motion picture having no vertical correlation. In FIGS. 29 to 31, a reference numeral 111 designates a base band signal, 112 designates a fly-back signal in the interlaced scanning, 113 designates a frequency band eliminated through the filtering processing, and 114 designates a fly-back signal admixed with the base band. In the hitherto known vertical enhancement circuit, the gain is increased in a vertical high frequency range of the luminance signal (e.g. in the vicinity of 262.5 television lines). Consequently, realization of high resolution is accompanied with significant interlacing interference due to the fly-back signal 114.

An enhancement circuit of this type is disclosed in Japanese Patent Application Laid-Open No. 19365/1985 (JP-A-No. 60-19365). Furthermore, a known extended definition TV system is disclosed in the publication "Extended Definition TV Fully Compatible with Existing Standards" TAKAHIRO FUKINUKI ET AL, IEEE Transactions on Communications, Vol. COM-32, No. 8, August 1984. Furthermore, a known motion-compensated prediction system is disclosed in the publication "A Motion-Compensated Interframe Coding Scheme for Television Pictures" YUICHI NINOMIYA ET AL, IEEE Transactions on Communications, Vol. COM-30, No. 1, January 1982.

SUMMARY OF THE INVENTION

An object of the present invention is to reduce the presence of cross-color phenomenon in the YC-signal separation processing of a composite color television signal by providing a high precision YC-signal separation technique.

In this connection, it should be pointed out that even an ideal processing cannot provide the YC-signal separation without being accompanied with the cross-talk for a motion picture having no vertical correlation. Accordingly, the basic concept of the invention resides in that the cross-color phenomenon is reduced in appearance by lowering the gain of the color signal resulting from the YC-signal separation only when the satisfactory YC-separation is impossible. Unnaturalness resulting from the lowering of gain of the color signal appears only in the edge portion of a motion picture without providing any appreciable eye-sore. As the consequence, significant improvement of the total image quality can be accomplished by suppressing the cross-color phenomenon.

Another object of the present invention is to provide an enhancement circuit which is capable of reproducing images with a high resolution while preventing interference signals from becoming significant.

In this connection, the basic concept of the present invention resides in that the level of enhancement (emphasis of high frequency components) of the luminance signal resulting from the YC-signal separation is changed in accordance with the magnitude of motion of a picture or vertical correlation or both of them.

In a preferred embodiment of the present invention, there are employed a frame memory, a motion detecting circuit and a vertical correlation detecting circuit, wherein the YC-signal separation (i.e. separation of the luminance and color difference signals) is performed by means of a time-axis filter for a still picture. On the other hand, for a motion picture having a vertical correlation, the YC-signal separation is effectuated by a vertical-axis filter. Finally, for a motion picture having no vertical correlation, the YC-signal separation is carried out by means of a horizontal-axis filter or a two-dimensional filter operative in the horizontal and vertical directions. These filters constitute an adaptive YC-signal separation circuit. The luminance signal resulting from the YC-signal separation is supplied to an enhancement circuit for emphasizing high frequency components. It should be recalled that the interlacing interference and the YC cross-talk are produced only in the processing of a motion picture having no vertical correlation. Accordingly, the magnitude of enhancement performed by the horizontal and vertical enhancement circuit is varied in accordance with the magnitudes of motion and vertical correlation detected by the adaptive YC-signal separation circuit. More specifically, the level of the enhancement is lowered upon processing a motion picture having large magnitudes of motion and vertical correlation. In this way, the high resolution can be realized while suppressing simultaneously the interlacing interference as well as dot interference.

In another preferred embodiment, a frame memory and a motion detecting circuit ar employed for constituting an adaptive YC-signal separation circuit in which the YC-signal separation is effected by means of a time-axis filter for a still picture, while the YC-separation is effectuated by means of a vertical-axis filter for a motion picture. The luminance signal resulting from the adaptive YC-separation is supplied to horizontal and vertical enhancement circuits to be emphasized in the high frequency range. The interlacing interference and the YC cross-talk take place for the motion picture having no vertical correlation. Accordingly, the enhancement levels of horizontal and vertical enhancement circuits are varied in accordance with the magnitude of motion detected by the adaptive YC-signal separation circuit. More specifically, the level of enhancement is lowered for a motion picture whose motion is less significant. In this manner, the still picture can be reproduced with high resolution, while a motion picture can be reproduced in the state in which the interlacing interference and dot interference are significantly suppressed.

BRIEF DESCRIPTION OF THE DRAWINGS

FIGS. 18, 19, 20, 21, 22 and 23 are block diagrams showing other embodiments of the present invention;

DESCRIPTION OF THE PREFERRED EMBODIMENTS

Figure 1:
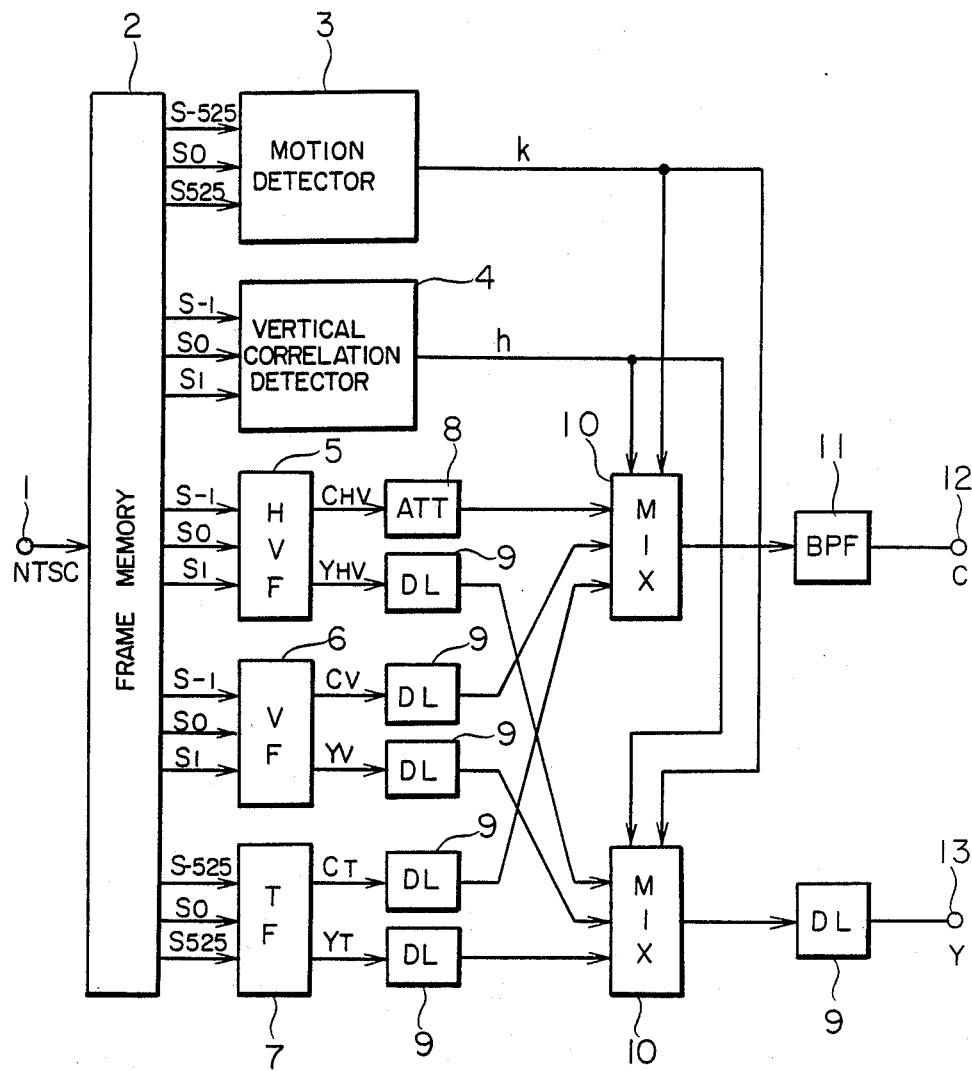
FIGS. 1 and 2 are block diagrams showing general arrangements of the color television signal processing circuits according to exemplary embodiments of the present invention.
Figure 2:
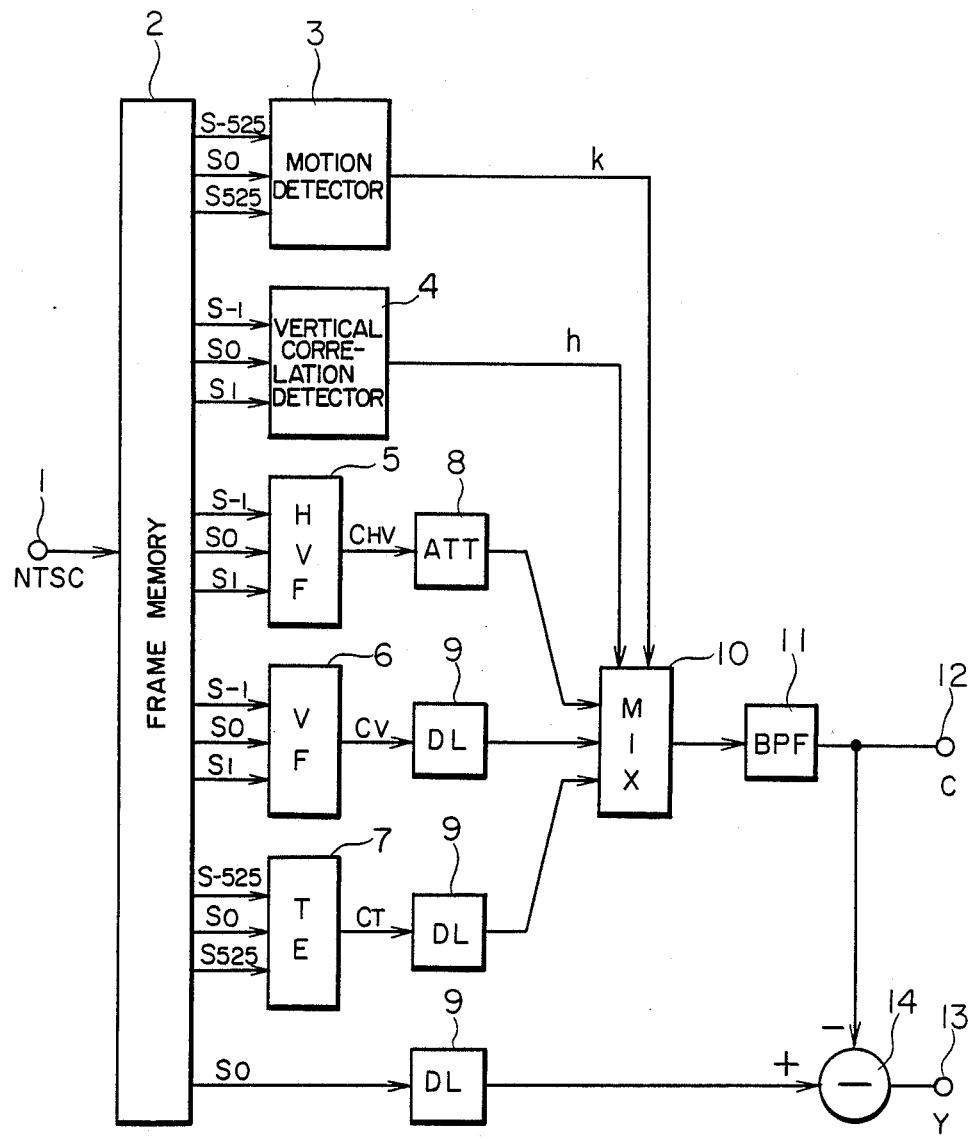
Figure 3:
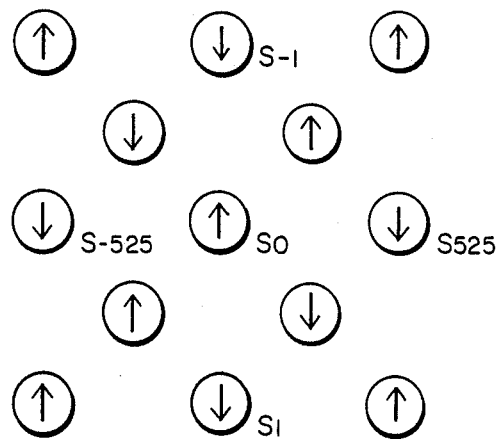
FIG. 3 is a view for illustrating a sequential patter of scanning lines.

FIGS. 1 and 2 show first and second embodiments of the present invention. In these figures, a reference numeral 1 denotes an input terminal for a composite color television signal sampled at a frequency of $4 \times f_{SC}$ (where $f_{SC}$ represents the subcarrier frequency for color difference signal), a numeral 2 denotes a frame memory, 3 denotes a motion detecting circuit, 4 denotes a vertical correlation detecting circuit, 5 denotes a two-dimensional filter of horizontal and vertical axes, 6 denotes a vertical-axis filter, 7 denotes a time-axis filter, 8 denotes an attenuator, 9 denotes a delay circuit, 10 denotes a mixer circuit having three inputs, 11 denotes a bandpass filter, 12 denotes an output terminal for the color difference signal C, 13 denotes an output terminal for the luminance signal Y, and a numeral 14 denotes a subtracter. Herein, description will be made by taking an NTSC color television signal as an example of the composite color television signal. FIG. 3 shows a sequence or pattern of scanning lines. In the figure, arrows indicate phases of the subcarrier for the color difference signal. Taking into consideration the subcarrier, the NTSC color television signal may be regarded as being constituted by repetition of two frames. In FIG. 3, a symbol $S_0$ represents the currently generated scanning line, a symbol $S_{-525}$ represents a scanning line generated one frame before the current scanning line $S_0$, a symbol $S_{525}$ represents the scanning line generated one frame after the current scanning line $S_0$, a symbol $S_{-1}$ represents a scanning line immediately preceding to the current scanning line $S_0$, and $S_1$ represents a scanning line immediately succeeding to $S_0$. In the case of the NTSC system, when the sampling frequency is $4 \times f_{SC}$, the horizontal positions at which the scanning lines $S_{-525}$, $S_{-1}$, $S_0$, $S_1$ and $S_{525}$ are sampled are aligned with one another, whereby the processing as involved is facilitated. These scanning lines $S_{-525}$, $S_{-1}$, $S_0$, $S_1$ and $S_{525}$ are outputted from the frame memory 2. The motion detecting circuit 3 determines a magnitude of motion k on the basis of, for example, $S_{-525}$, $S_0$ and $S_{525}$.

As will be apparent from the above description of the embodiments shown illustrated in FIGS. 1 and 2, YC-separation can be effectuated in each of three modes (V, H, T) as illustrated in the following table, according to the teaching of the invention as exemplified in the illustrative embodiments. To this end, one of the three modes mentioned above is selected in dependence on the magnitude k of the detected motion and a value h of the vertical correlation.

TABLE 1

| Types of Picture | Vertical Correlation | |
|---|---|---|
|  | Presence | Absence |
| Motion | V-mode | H-mode |
| Still | T-mode | T-mode |

Figure 4:
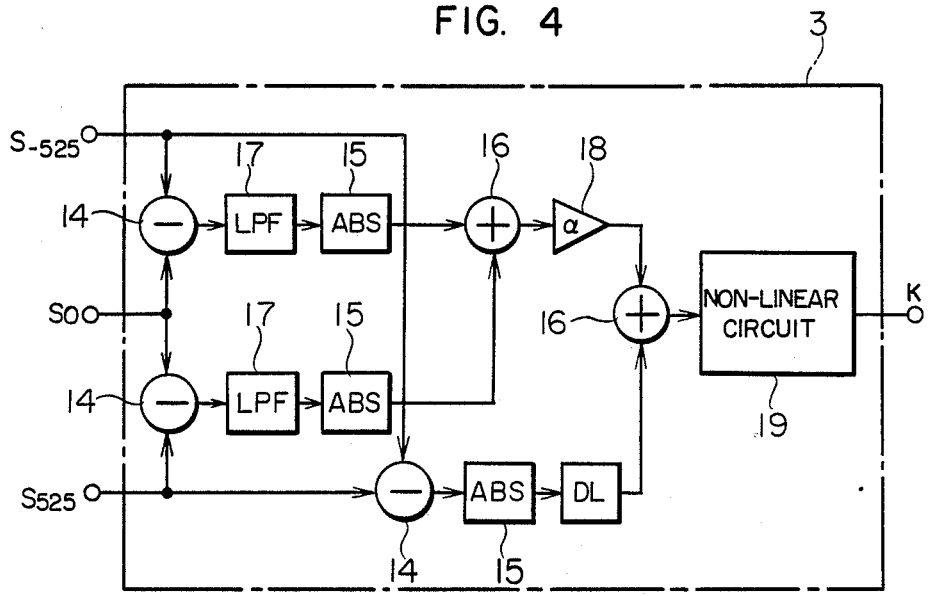
FIG. 4 is a block diagram showing an exemplary embodiment of a motion detecting circuit.
Figure 5:
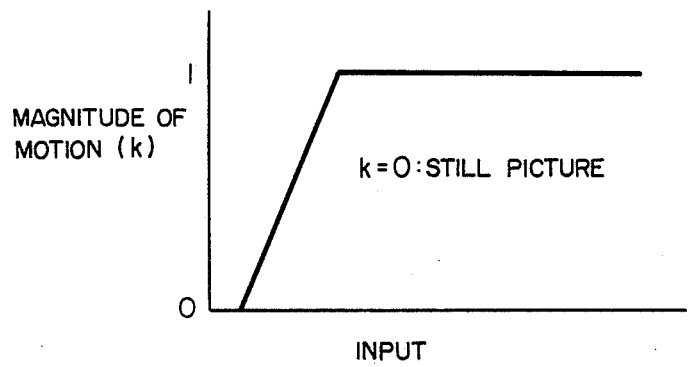
FIG. 5 is a view for illustrating graphically input-versus-output characteristic of a non-linear circuit.

FIG. 4 shows an exemplary circuit configuration of the motion detector 3 which is so arranged as to determine the motion magnitude k from low-frequency components of one-frame difference signal (i.e. signal representative of difference between the two adjacent frames) and two-frame difference signal (i.e.a signal representative of difference between every other frames). In FIG. 4, a reference numeral 15 denotes a circuit which assumes an absolute value, 16 denotes an adder, 17 denotes a low-pass filter having a pass band, for example, of less than 2 MHz, 18 denotes a multiplier having a gain $\alpha$, and 19 denotes a non-linear circuit. For the one-frame difference signal, the high-frequency component is eliminated through the low-pass filter 17 for the purpose of preventing the erroneous motion detecting operation due to phase inversion of the subcarrier. FIG. 5 graphically illustrates an example of input-versus-output characteristic of the non-linear circuit 19. It is assumed that $0 \leq k \leq 1$. Then, in the case of a still picture, $k=0$. With the arrangement of the motion detecting circuit shown in FIG. 4, motions or movements of Y signal and C signal can both be detected on the basis of the two-frame difference signal, while the speedy motion of low frequency components of Y signal can be detected on the basis of the low frequency components of the one-frame difference signal, whereby the detection of motion can be accomplished with high accuracy.

Figure 6:
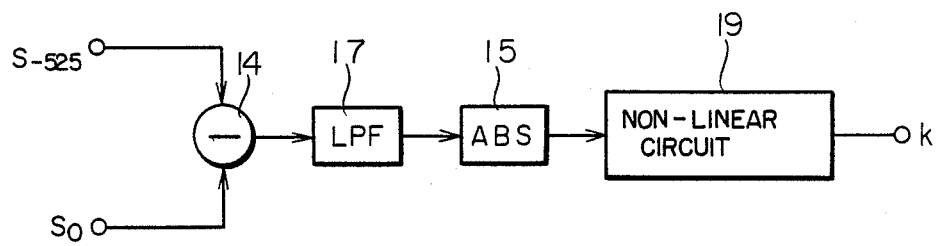
FIGS. 6 and 7 are block diagrams showing exemplary embodiments of the motion detecting circuit.
Figure 7:
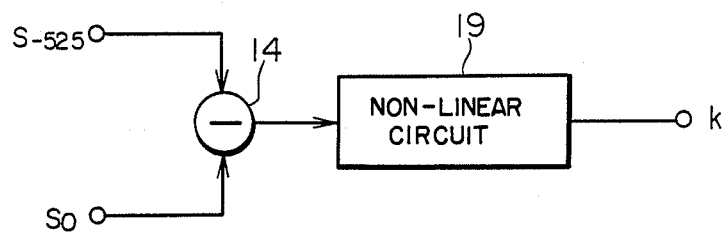

Other exemplary embodiments of the motion detecting circuit 3 are shown in FIGS. 6 and 7, respectively. More specifically, the circuit shown in FIG. 6 is so arranged as to detect the magnitude of motion on the basis of the low frequency component of the one-frame difference signal, while the circuit shown in FIG. 7 is designed to determine the magnitude of motion on the basis of the two-frame difference signal.

Figure 8:
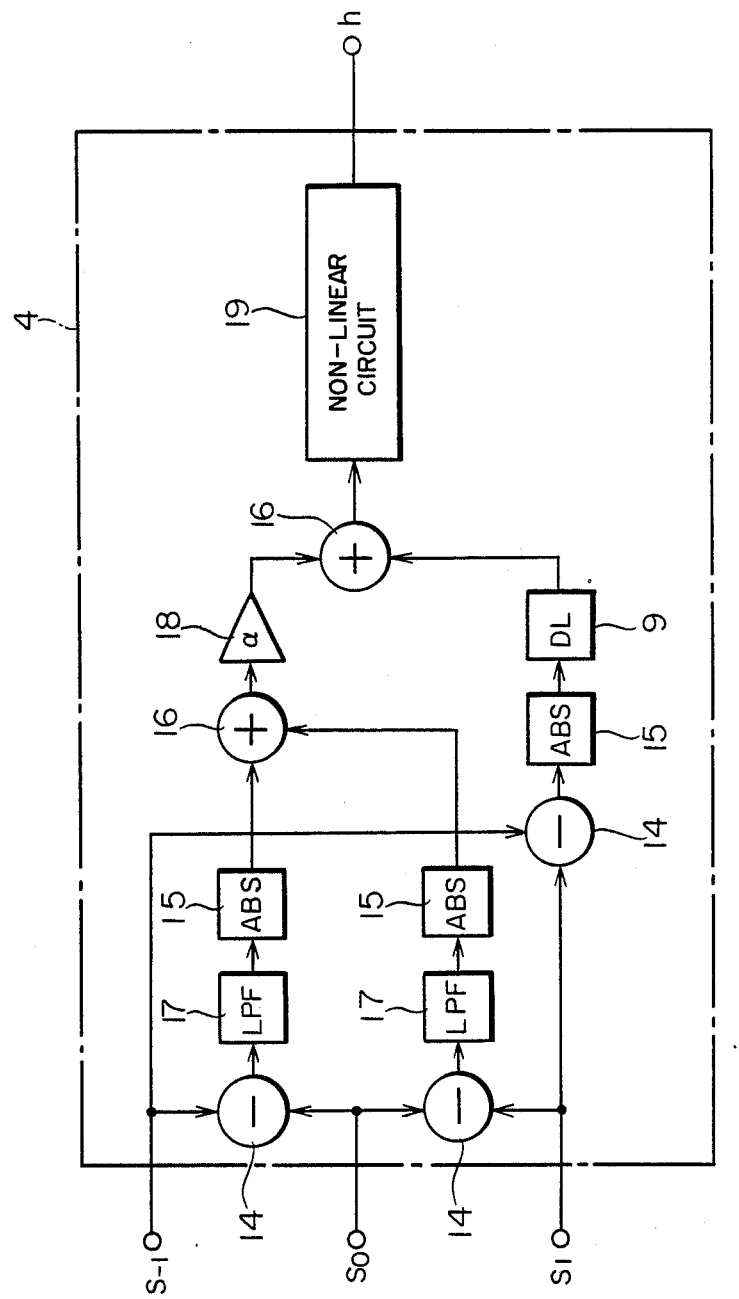
FIG. 8 is a block diagram showing a exemplary embodiment of the vertical correlation detecting circuit.

On the other hand, FIG. 8 shows an exemplary embodiment of the vertical correlation detecting circuit 4. This circuit is implemented in the same circuit configuration as the one shown in FIG. 4 and operates to determine the magnitude h of the vertical correlation on the basis of the low frequency components of one-line difference signal (i.e. signal representative of difference between two adjacent scanning lines) and two-line difference signal (i.e. signal representative of difference between the every other scanning lines). It is assumed that $0 \leq h \leq 1$. When vertical correlation is present, then $h=0$. With the vertical correlation detecting circuit shown in FIG. 8, vertical correlations of both Y and C signals can be detected on the basis of the two-line difference, while fine vertical correlation of the low frequency components of Y signal can be detected on the basis of the low frequency component of the one-line difference, whereby the high accuracy detection of the vertical correlation can be realized.

Figure 9:
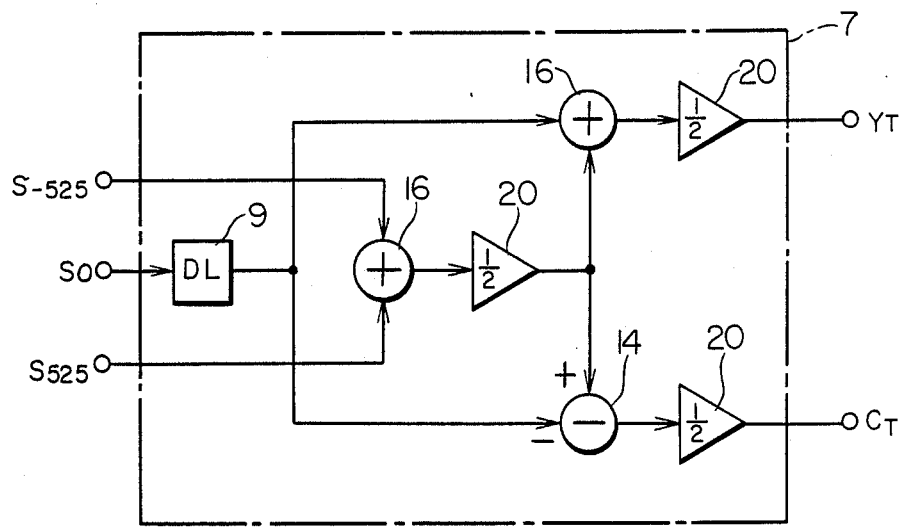
FIG. 9 is a block diagram showing an exemplary embodiment of the time-axis filter.

An exemplary embodiment of the time-axis filter 7 is illustrated in FIG. 9. This filter serves to separate the luminance signal $Y_T$ and the color difference signal $C_T$ from $S_{-525}$, $S_0$ and $S_{525}$ in accordance with the following expressions:

$$Y_T = \tfrac{1}{4}(S_{-525} + 2S_0 + S_{525})$$

$$C_T = \tfrac{1}{4}(-S_{-525} + 2S_0 - S_{525})$$

Figure 10:
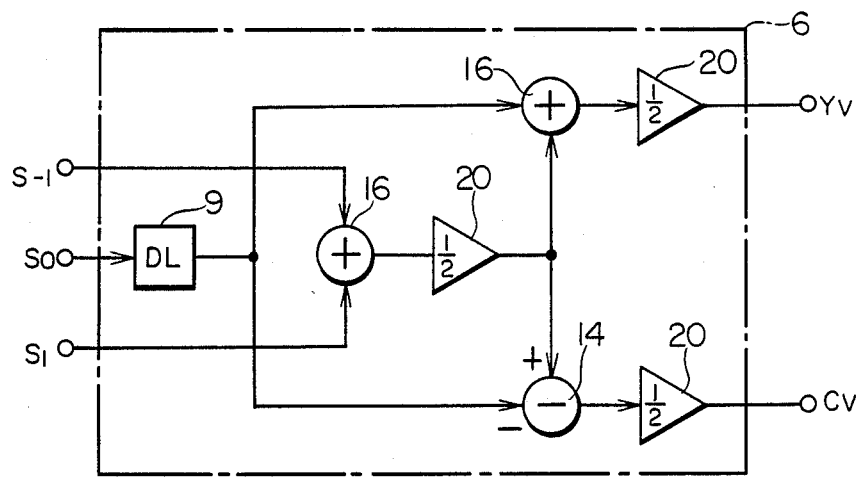
FIG. 10 is a block diagram showing an exemplary embodiment of the vertical-axis filter.

FIG. 10 shows an exemplary embodiment of the vertical-axis filter 6 which serves to separate the luminance signal Y and the color difference signal $C_V$ from $S_{-1}$, $S_0$ and $S_1$ in accordance with the following expressions.

$$Y_V = \tfrac{1}{4}(S_{-1} + 2S_0 + S_1)$$

$$C_V = \tfrac{1}{4}(-S_{-1} + 2S_0 - S_1)$$

Figure 11:
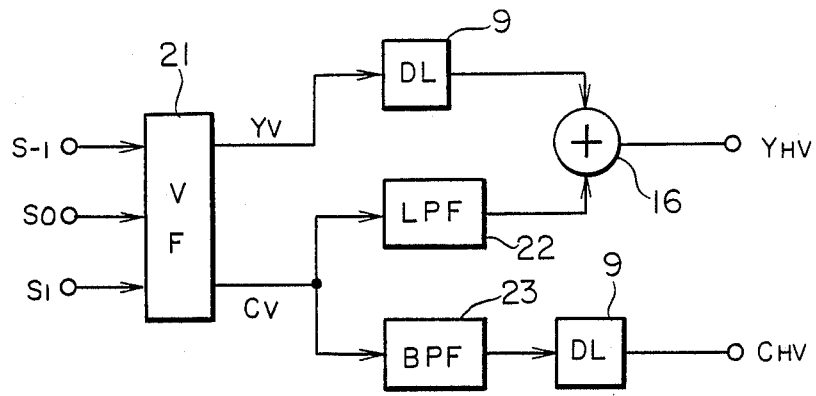
FIGS. 11, 12 and 13 are block diagrams showing exemplary arrangements of the two-dimensional filter.
Figure 12:
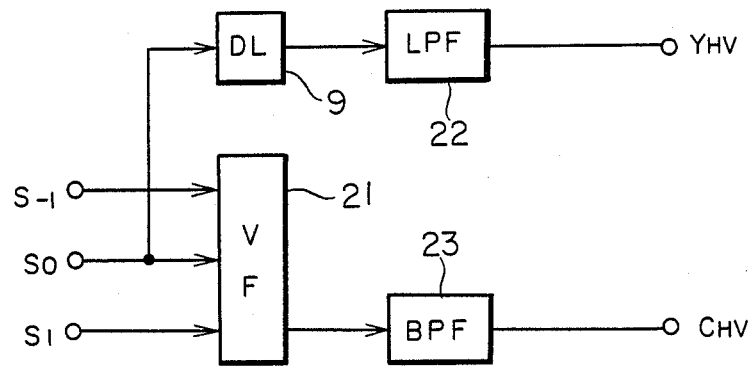
Figure 13:
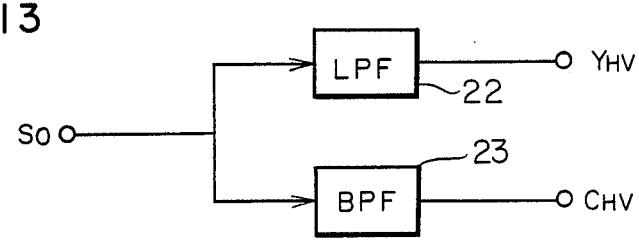

FIGS. 11 to 13 shows exemplary circuit configurations of the two-dimensional filter 5. In these figure, a reference numeral 21 denotes a vertical-axis filter which may be implemented, for example, in the circuit configuration shown in FIG. 10, a numeral 22 denotes a low-pass filter having a pass band, for example, of less than 3 MHz, and a numeral 23 denotes a band pass filter having a pass band, for example, of $f_{SC} \pm 0.5$ MHz. The gain of the color difference signal $C_{HV}$ is reduced through the attenuator 8.

Figure 14:
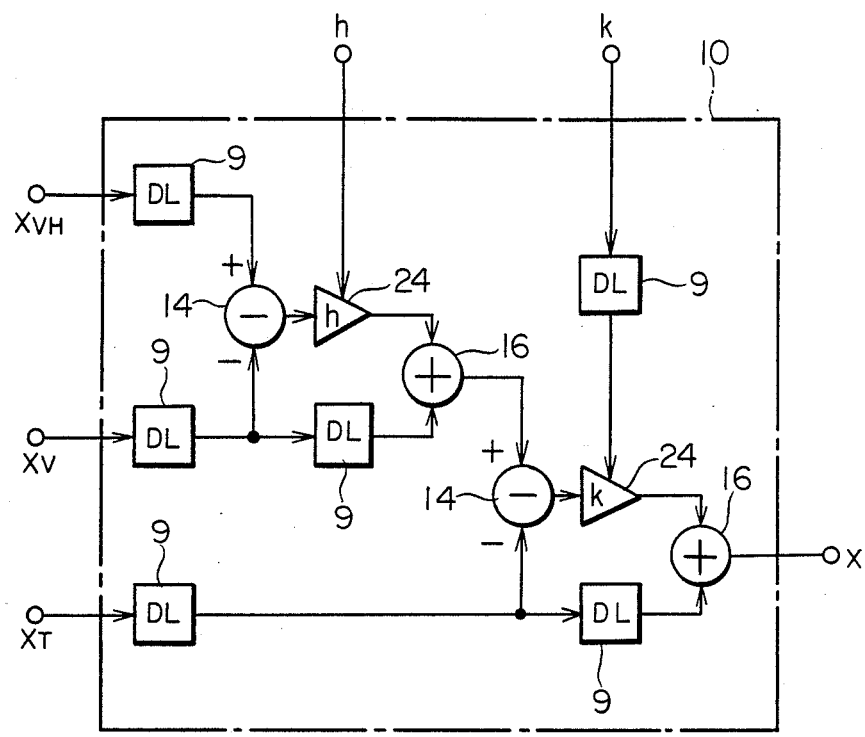
FIG. 14 is a block diagram showing an exemplary arrangement of a mixing circuit.

FIG. 14 shows an exemplary embodiment of the mixer circuit 10. In the figure, a reference numeral 24 denotes a multiplier having gain which can be varied in response to the control signal k or h. The multiplier may be realized by a ROM (read-only memory) storing a look-up table. The mixer circuit shown in FIG. 14 serves for synthesizing the color difference signal or luminance signal in accordance with the following expression:

$$X = k\{hX_{VH} + (1-h)X_V\} + (1-k)X_T (X = C \text{ or } Y)$$

The color difference signal is limited to the band width of $f_{SC}\pm 1$ MHz by the band-pass filter 11. In this connection, it should be noted that the pass band of the band-pass filter 11 is selected broader than that of the band-pass filter 23. In the case of the embodiments shown in FIG. 1 and 2, unless vertical correlation is found in the motion picture which gives rise to the occurrence of cross-talk, then $C=C_{VH}$ applies valid. In this way, with the arrangements shown in FIGS. 1 and 2, the cross-color phenomenon can be reduced in appearance. More specifically, the arrangement shown in FIG. 1 exhibits noise reduction effect due to the feature that $Y_V$ and $Y_T$ are determined through averaging on the scanning-line basis, while the arrangement shown in FIG. 2 is advantageous in that the scale of hardware can be significantly reduced.

Figure 15:
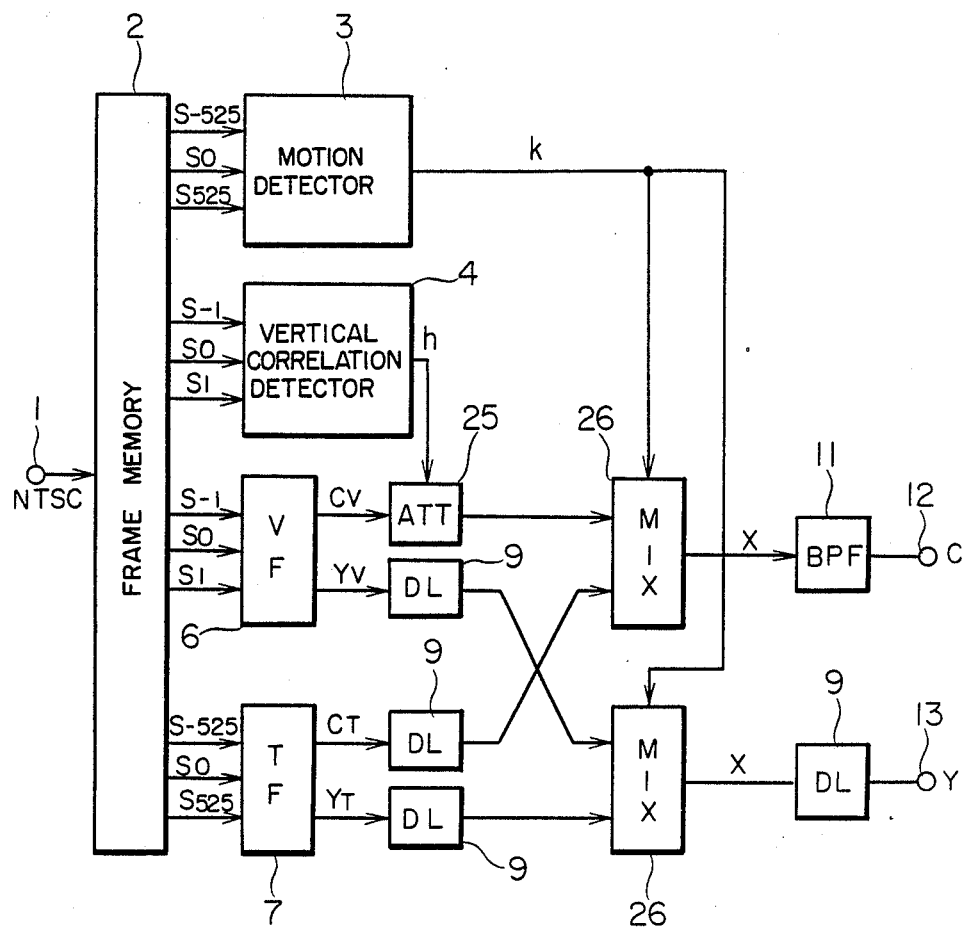
FIGS. 15 and 16 are block diagrams showing other embodiments of the present invention.
Figure 16:
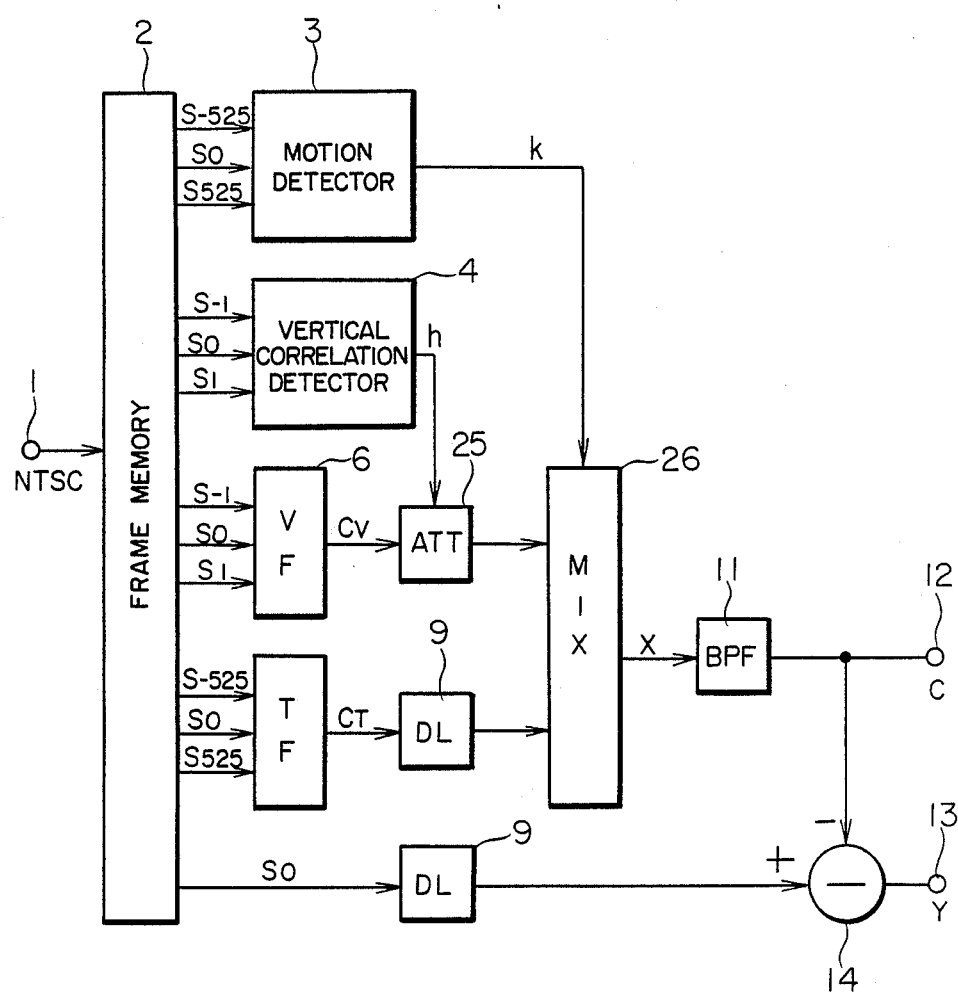
Figure 17:
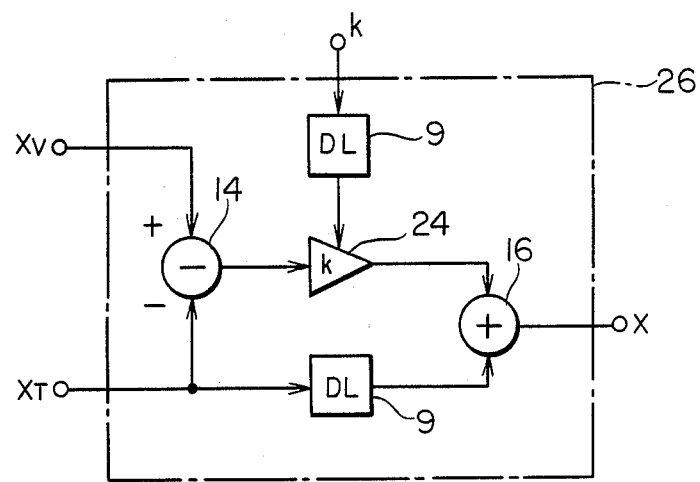
FIG. 17 is a block diagram showing another arrangement of the mixing circuit.

FIGS. 15 and 16 show other embodiments of the present invention. In these figures, reference numerals 1, 2, 3, 4, 6, 7, 9, 11, 12, 13 and 14 denote the same or like circuit or components as those described hereinbefore in conjunction with FIGS. 1 and 2. Additionally, a reference numeral 25 denotes an attenuator having a variable attenuation factor, and 26 denotes a mixer circuit having two inputs. The motion magnitude k is determined through the motion detecting circuit 3. The vertical correlation value or level h is determined by the vertical correlation detecting circuit 4. The components $C_V$ and $Y_V$ are detected by the vertical-axis filter 6, while $C_T$ and $Y_T$ are determined through the time-axis filter 7. Only when the vertical correlation is absent, the component $C_V$ is attenuated by the attenuator 25. This attenuation factor may be selected equal to $(1-h/2)$ and may be changed over stepwise in dependence on the magnitude h of vertical correlation. The mixer circuit 26 functions to mix the output of the vertical-axis filter 6 with that of the time-axis filter 7. An exemplary configuration of the mixer circuit 26 is shown in FIG. 17. This circuit 26 performs synthesization of the color difference signal components or luminance signal components in accordance with the following expression:

$$X=k\cdot X_V+(1-k)\cdot X_T$$

In the case of motion picture, the color difference signal is given by $C_V$. Unless vertical correlation exists in the motion picture which generates the cross-talk, gain of $C_V$ is reduced by the attenuator 25. In this way, with the arrangements shown in FIGS. 15 and 16, the cross-color phenomenon can be reduced in appearance. The embodiment shown in FIG. 15 exhibits the noise suppression effect by virtue of the feature that $T_V$ and $Y_T$ are determined through averaging on the scanning-line basis. On the other hand, the embodiment shown in FIG. 16 is advantageous in that the scale of hardware structure can be reduced.

Figure 18:
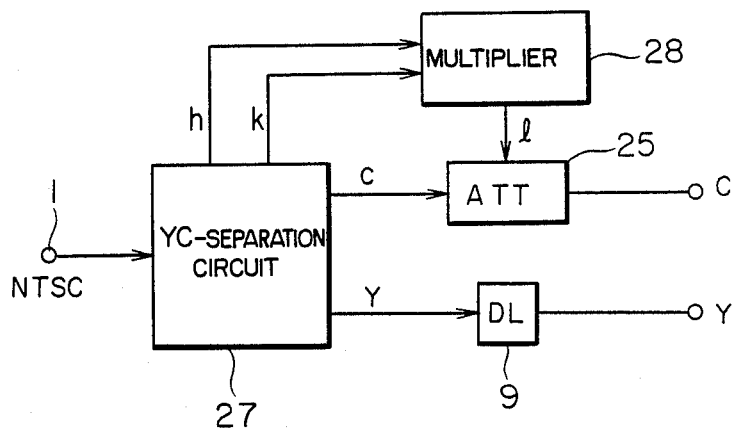

FIG. 18 shows another exemplary embodiment of the present invention. In the figure, reference numeral 1, 9 and 25 denote like or the same parts as those shown in FIGS. 15 and 16. The embodiment shown in FIG. 18 includes a YC-separation circuit incorporating a frame memory and performs an adaptive YC-separation by determining the motion magnitude k and the vertical correlation h. A reference numeral 28 denotes a multiplication circuit which determines $l=k\times h$. Provided that $0\leq k\leq 1$ and that $0\leq h\leq 1$, then $0\leq l\leq 1$. The value of l is "1" when no vertical correlation is found (i.e. $h=1$) in the motion picture (i.e. $k=1$). The color difference signal is attenuated by the attenuator 25 in dependence on the value of l. The attenuation factor in concern may be selected to equal $(1-1/2)$. With the arrangement shown in FIG. 18, gain of the color difference signal can be reduced when no vertical correlation is detected in the motion picture which gives rise to the occurrence of cross-talk, whereby the cross-color phenomenon can be made to appear as insignificant.

Figure 19:
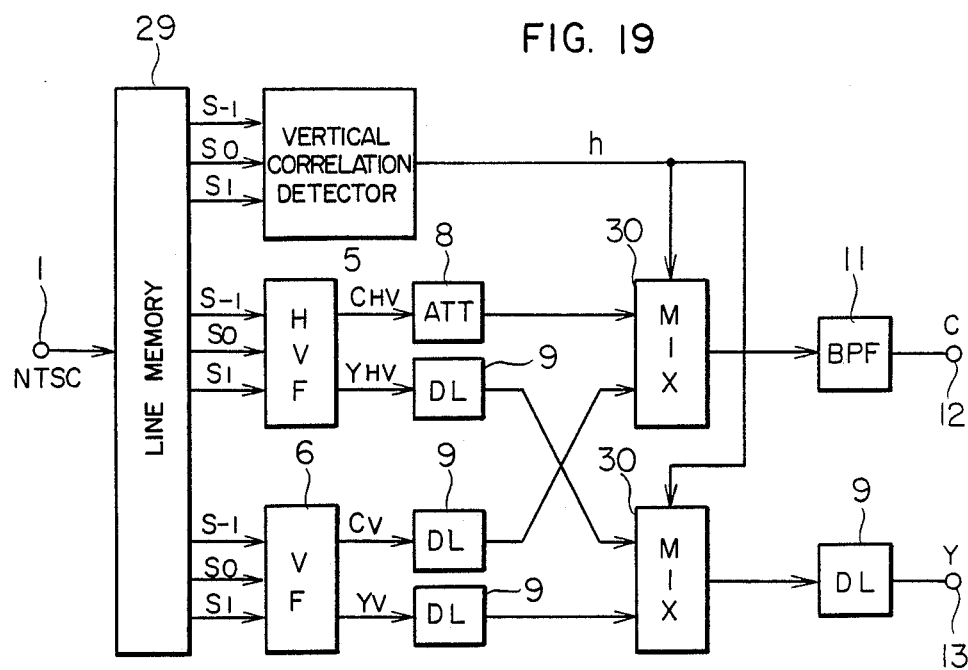
Figure 20:
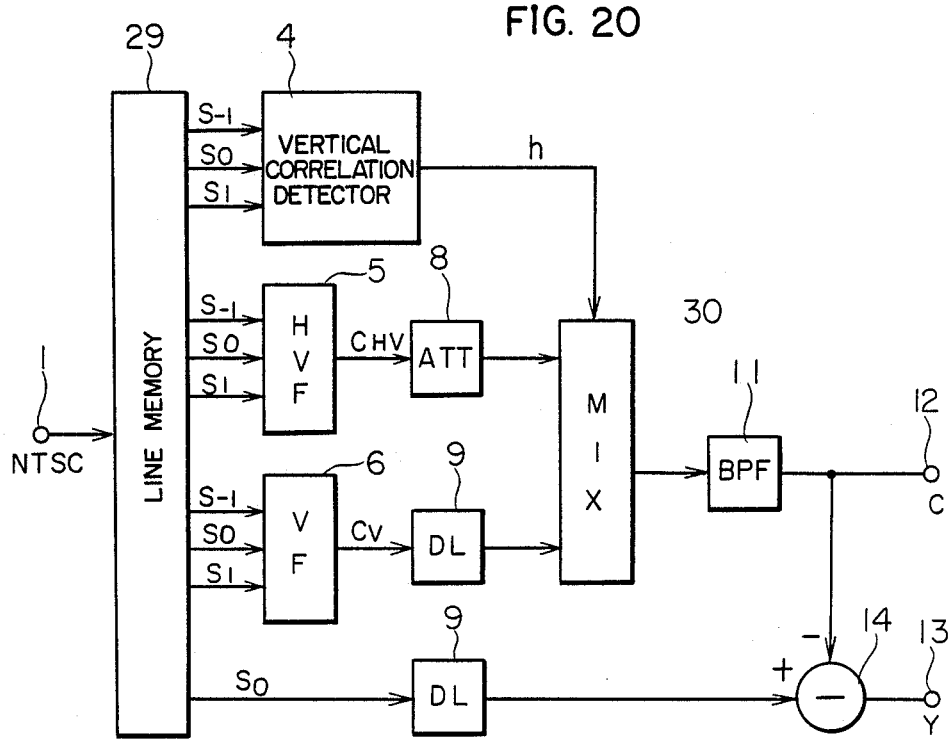

FIGS. 19 and 20 show further exemplary embodiments of the present invention. In these figures, reference numerals 1, 4, 5, 6, 8, 9, 11, 12, 13 and 14 denote like or the same circuits or components as those shown in FIGS. 1 and 2. The embodiments shown in FIGS. 19 and 20 further include a line memory 29 and a mixer circuit 30 having two inputs. The line memory 29 outputs $S_{-1}$, $S_0$ and $S_1$ on the basis of which the vertical correlation detecting circuit 4 detects the vertical correlation h while the two-dimensional filter 5 determines signal components $C_{HV}$ and $Y_{HV}$, and the vertical-axis filter 6 determines $C_V$ and $Y_V$. The gain of the component $C_{HV}$ is reduced by the attenuator 8. The mixer circuit 30 synthesizes the color difference signal with the luminance signal. This mixer circuit 30 may be implemented, for example, in the configuration shown in FIG. 17. In that case, however, $X_V$, $X_T$ and k must be substituted for by $X_{HV}$, $X_V$ and h, respectively. With the arrangements shown in FIGS. 19 and 20, the gain of the color difference signal is reduced when no vertical correlation, giving rise to the occurrence of cross-talk, is present, which in turn means reduction in appearance of the cross-color. The embodiment shown in FIG. 19 has the noise suppression effect due to the feature that $Y_V$ is determined through averaging on the scanning-line basis. On the other hand, the embodiment shown in FIG. 20 is advantageous in that the scale of hardware structure can be reduced.

FIGS. 21 and 22 show still further embodiments of the present invention. In these figures, reference numerals 1, 4, 6, 11, 12, 13, 14 and 25 denote same or like circuits and parts as those described hereinbefore with reference to FIGS. 15 and 16. The embodiments shown in FIGS. 21 and 22 each include a line memory 29. The vertical correlation detecting circuit 4 determines the magnitude h of vertical correlation, while the vertical-axis filter 6 determines the components $C_V$ and $Y_V$. In the absence of the vertical correlation, only the component $C_V$ is attenuated by the attenuator 25. In that case, the attenuation factor may be set equal to $(1-h/2)$ and changed stepwise in accordance with the magnitude of vertical correlations detected. With the arrangements shown in FIGS. 21 and 22, the cross-color phenomenon can be rendered less appreciable because gain of the color difference signal can be lowered unless vertical correlation giving rise to occurrence of the cross-talk is present. The embodiment shown in FIG. 21 further ensures noise reduction due to determination of the component $Y_V$ through averaging on the scanning-line basis. On the other hand, the embodiment shown in FIG. 22 is advantageous in that the hardware scale thereof can be reduced.

FIG. 23 shows yet another embodiment of the present invention. In the figure, reference numerals 1, 9 and 25 denote same or like elements as those shown in FIGS. 15 and 16. A reference numeral 31 denotes an YC-separation circuit incorporating a line memory and performs determination of the vertical correlation magnitude h and adaptive YC-separation. The YC-separation circuit 31 determines the color difference signal and the luminance signal. The attenuator circuit 25 attenuates the color difference signal in dependence on the vertical correlation value h. In that case, the attenuation factor may be set equal to $(1-h/2)$. With the arrangement shown in FIG. 23, the appearance of cross-color phenomenon can be suppressed in the case where there is present no vertical correlation which gives rise to the occurrence of the cross-talk because the gain of the color difference signal can be lowered.

The embodiments of the present invention described above is effective in reducing or suppressing the cross-color phenomenon in appearance because the gain of the color difference signal can be lowered only when the inter-YC cross-talk takes place.

Figure 24:
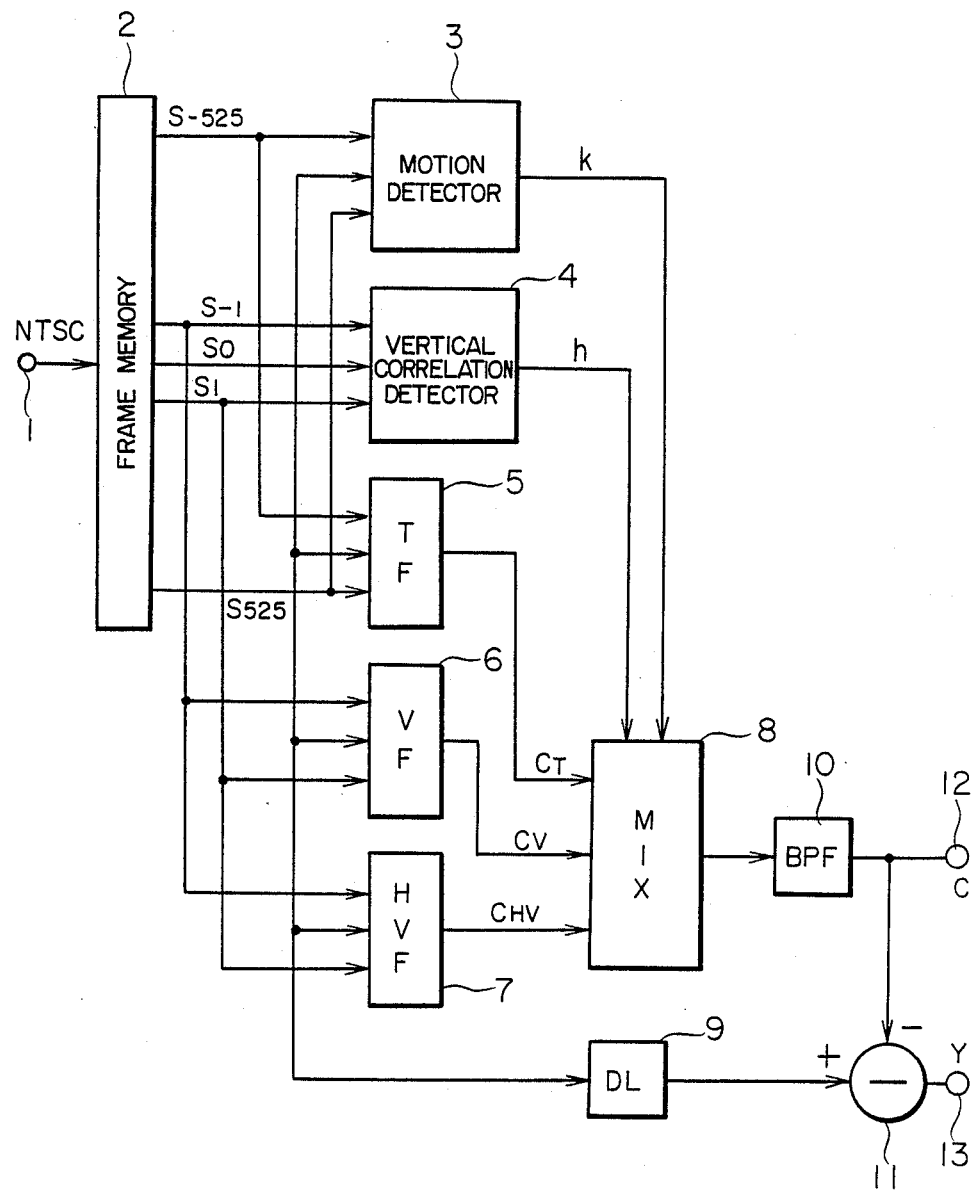
FIG. 24 is a block diagram showing still another embodiment of the present invention.
Figure 25:
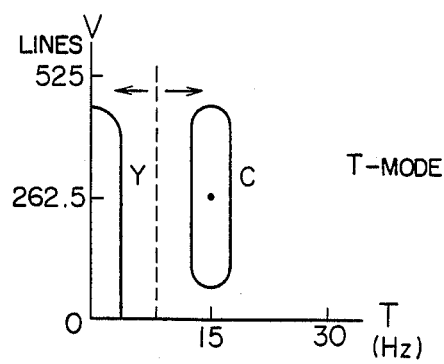
FIGS. 25 to 27 are views for graphically illustrating the principle of the YC-signal separation in T-mode (still picture having mode), V-mode (motion picture vertical correlation) and H-mode (motion picture having no vertical correlation), respectively, of the embodiment shown in FIG. 24.
Figure 26:
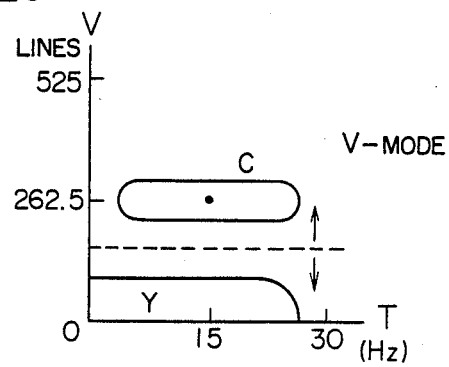
Figure 27:
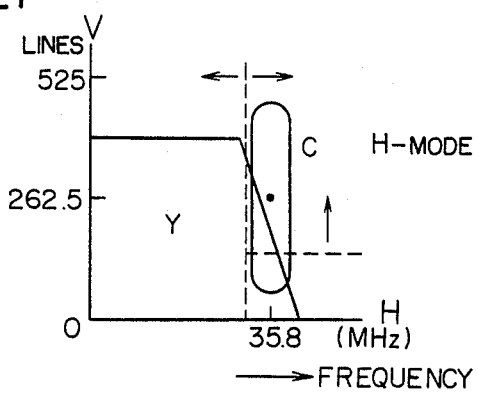

FIG. 24 shows a further embodiment of the invention which differs from those shown in FIGS. 1 and 2 in that the attenuator and the delay circuit are omitted this embodiment. Parenthetically, the same or like blocks and parts as those shown in FIGS. 1 and 2 are denoted by using the same reference numerals in FIG. 24. In conjunction with this embodiment, FIG. 25 illustrates the principle of the YC-separation in the case of a still picture (i.e. T-mode). In FIG. 25, time is taken along with the abscissa, while a vertical resolution power is taken along the ordinate with a horizontal vertical resolution power taken along the Z-axis. The YC-separation is carried out as indicated by a broken line. Similarly, FIG. 26 graphically illustrates the principle of the YC-separation in the case where the vertical correlation is found in a motion picture (i.e. in the V-mode). The YC-separation is effectuated as indicated by a broken line. Further, FIG. 27 illustrates the principle of the YC-separation in the case of a motion picture where no vertical correlation is found (i.e. in the H-mode). In this case, however, bands of the luminance signal Y and the color difference signal C overlap two-dimensionally. Accordingly, the YC-separation can be realized with higher accuracy by using a two-dimensional filter in which the vertical filter and the horizontal filter are combined rather than using a vertical or horizontal filter alone. The YC-separation illustrated in FIG. 27 is accompanied with some degradation in the resolution of the luminance signal Y and the color difference signal C. However, such degradation in the resolution is limited to the edge or boundary portion of a motion picture and does not provide any appreciable eye-sore. According to the overall effect, improvement of the image quality as a result of reduction in the cross-color and dot interference more than compensates for any degradation in resolution. This embodiment is also effective in reducing the inter-YC cross-talk.

Figure 28:
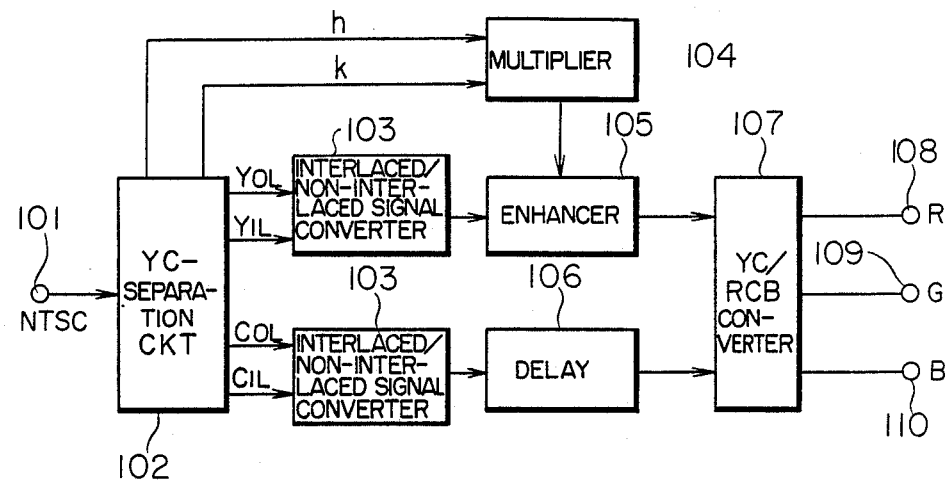
FIG. 28 is a block diagram showing a further embodiment of the present invention.
Figure 29:
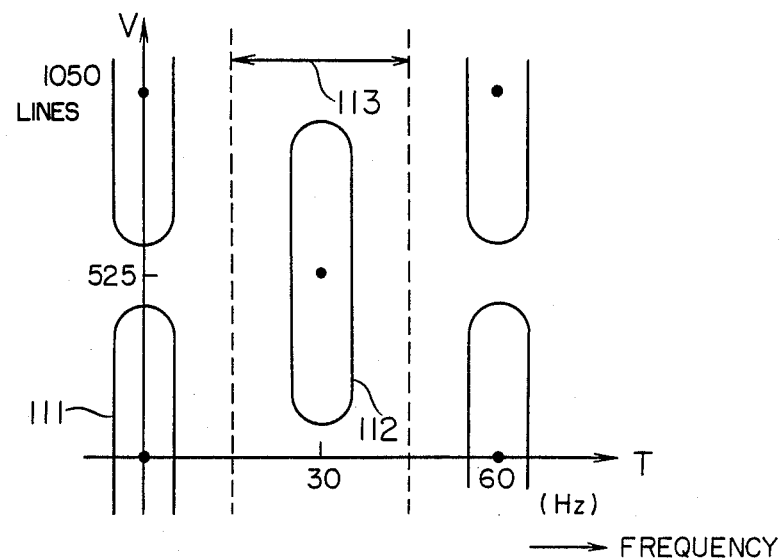
FIGS. 29, 30 and 31 are views for graphically illustrating frequency spatial characteristics.
Figure 30:
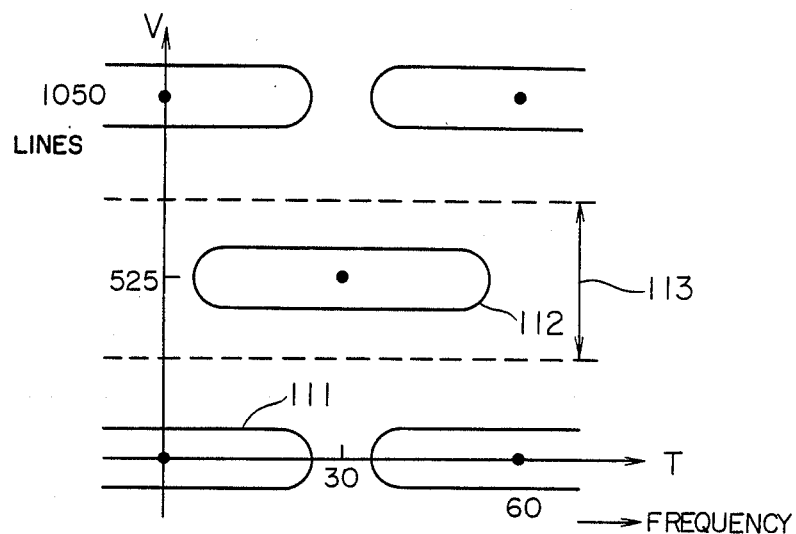
Figure 31:
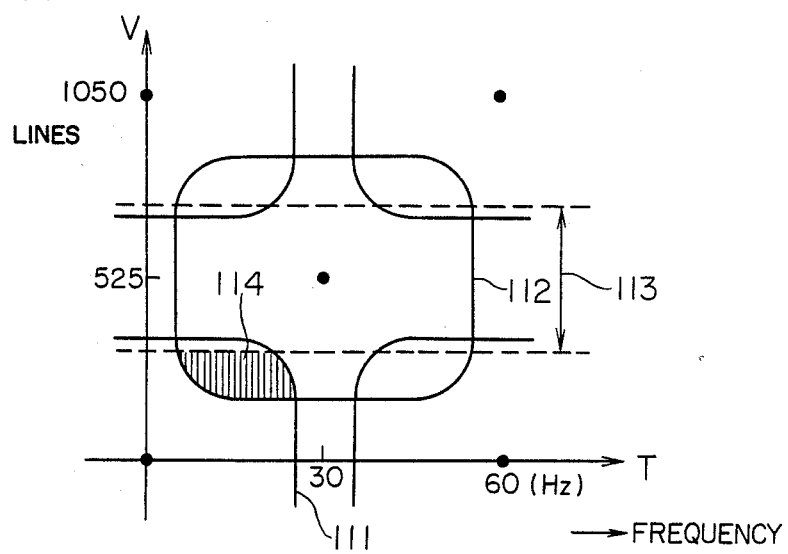
Figure 32:
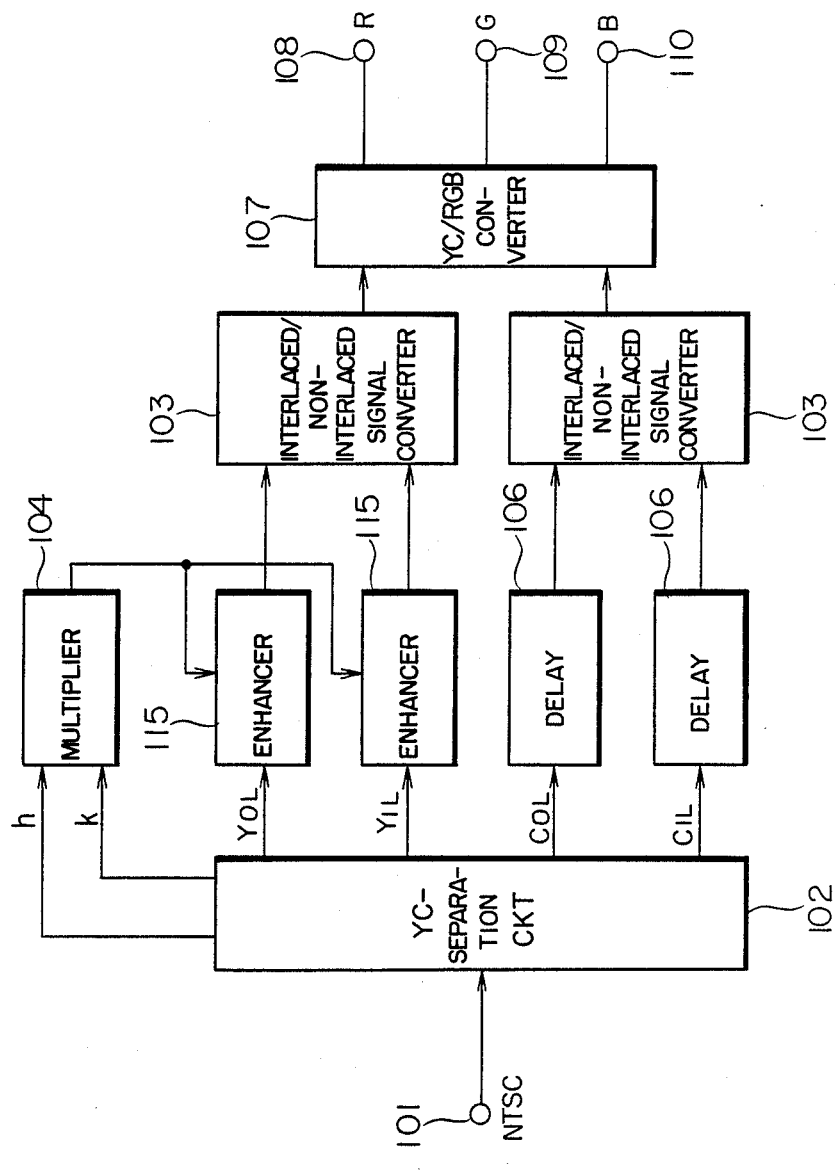
FIGS. 32, 33, 34, 35 and 36 are block diagrams showing exemplary embodiments of the present invention.
Figure 33:
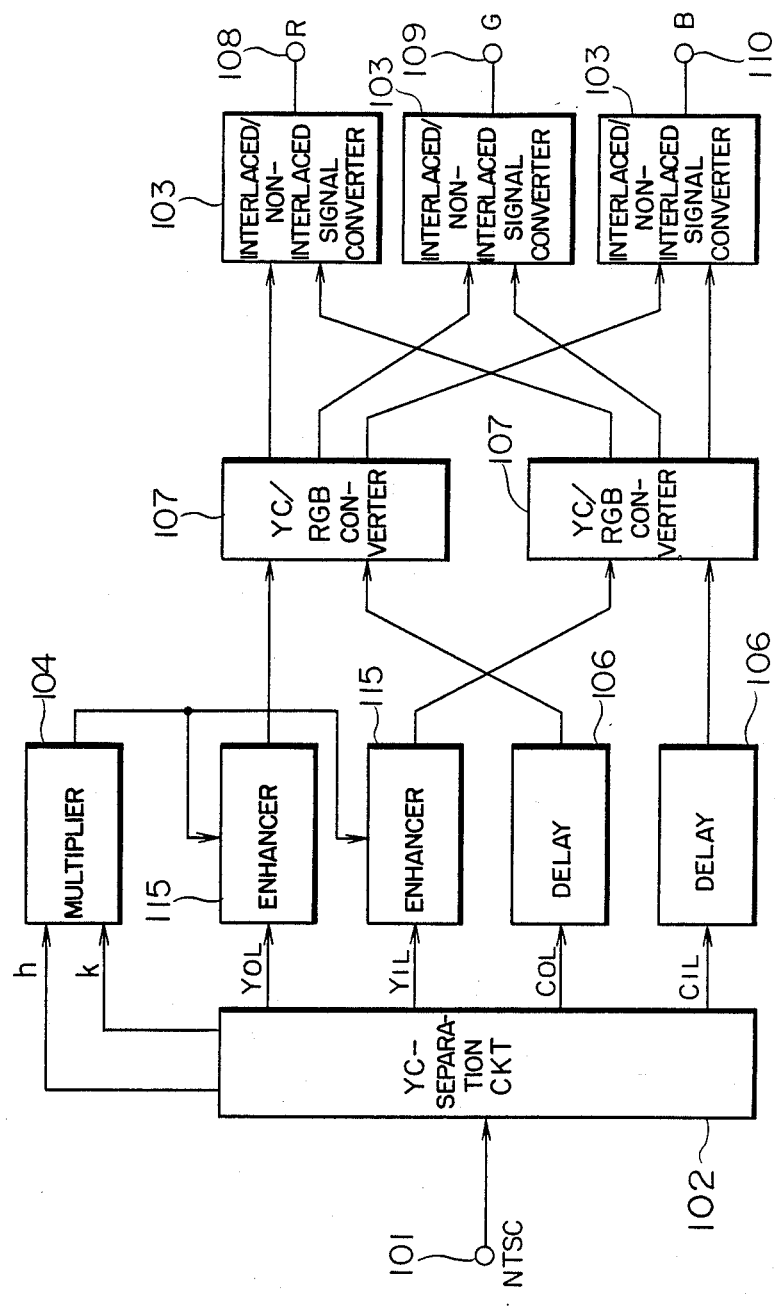

FIGS. 28, 32 and 33 show, respectively, first, second and third embodiments of the enhance circuit according to the present invention. In these figures, a reference numeral 101 denotes an input terminal for a composite color television signal sampled at a frequency of $4 \times f_{SC}$ (where $f_{SC}$ represents the frequency of subcarrier for the color difference signal). A numeral 102 denotes a YC-separation circuit which incorporates a frame memory, a motion detecting circuit and a vertical correlation detecting circuit and in which the YC-separation is effected by a time-axis filter for a still picture, while it is effected by a vertical-axis filter for a motion picture in which the vertical correlation is found. Further, in the case of a motion picture in which the vertical correlation is present, the YC separation is carried out by using a two-dimensional filter, as with the case of the embodiments shown in FIGS. 1 and 2. A reference numeral 103 denotes an interlaced/non-interlaced signal conversion circuit, 104 denotes a multiplication circuit, 105 denotes a variable enhancement circuit for the non-interlaced signal, 106 denotes a delay circuit, 107 denotes a YC/RGB conversion circuit, 108 denotes a R-signal output terminal, 109 denotes a G-signal output terminal, 110 denotes a B-signal output terminal, 115 denotes a variable enhancement circuit for the interlaced signal, h represents the magnitude of vertical correlation, k represents the magnitude of motion, $Y_{0L}$ represents a luminance signal (original line) of the scanning line supplied as an input signal, $Y_{1L}$ represents the luminance (interpolated line) of the scanning line obtained through interpolation, $C_{0L}$ represents a color difference signal of the scanning line supplied as an input signal, and $C_{1L}$ represents a color difference signal derived through interpolation. The interpolated line $Y_{1L}$ ($C_{1L}$) can be found by means of the motion adaptive interpolation using $Y_{0L}$ ($C_{0L}$). Or $Y_{1L}$ ($C_{1L}$) can be made by the outputs of the frame memory $S_{-525}-S_{525}$ like $Y_{0L}$ ($C_{0L}$) can be. The following description will be made on the assumption that the composite color television signal under consideration is an NTSC television signal. In that case, when the sampling frequency is selected to be $4 \times f_{SC}$, the processing is facilitated because the horizontal positions of the sampling points mutually coincide where the scanning lines located adjacent to each other in the time-axis direction and the vertical direction are sampled. The operation of the embodiments shown in FIGS. 28, 32 and 33 will be elucidated. An NTSC television signal is inputted to the YC-separation circuit 102, whereby the motion magnitude k, vertical correlation h, luminance signal $Y_{0L}$ and $Y_{1L}$, and color difference signals $C_{0L}$ and $C_{1L}$ are obtained. The motion magnitude k is multiplied with the vertical correlation h through the multiplier 104. It is assumed that $0 \leq k \leq 1$ and that $0 \leq h \leq 1$. When $k=0$, this means a still picture, while $k=1$ means a motion picture. Further, when $h=0$, this means the presence of the vertical correlation, while $h=1$ represents the absence of the vertical correlation. The product $h \times k$ outputted from the multiplier 104 is "1" when no vertical correlation is present in the motion picture. In the case of the embodiment shown in FIG. 28, the luminance signal and the color difference signals are non-interlaced signals converted through the interlaced/non-interlaced convertion circuit 103 which will hereinafter be described in detail. The enhance circuit 105 serves to emphasize the high frequency components (contour components) of the luminance signal. The magnitude of enhancement (emphasis) of the high frequency component may be changed over in dependence on the value of the product $h \times k$. More particularly, when $h \times k = 1$, enhancement is set to a minimum level and is progressively increased as the product $h \times k$ approaches "0". The signals Y and C are matched in timing by the delay circuit 106. The YC/RGB converter circuit 107 converts the YC signals into RGB signals, whereby non-interlaced R, G and B signals are produced from the output terminals 108, 109 and 110, respectively. Concerning FIGS. 29 to 31, description has hereinbefore been made in the section "Background of the Invention". In the case of the embodiments shown in FIGS. 32 and 33, enhancement of the signal is carried out before conversion into the non-interlaced signal. In other words, the luminance signals $Y_{0L}$ and $Y_{1L}$ are separately enhanced through the enhancer circuit 115. The magnitude of enhancement can be changed over in dependence on the value of the product h×k. As in the case of the embodiment shown in FIG. 28, enhancement is made minimum when h×k=1 and is gradually increased as the product approaches zero. The delay circuit 106 serves to match the signals Y and C in timing. In the case of the embodiment shown in FIG. 32, the interlaced/non-interlaced signal conversion circuit 103 outputs the non-interlaced Y and C signals which are subsequently converted to RGB-signals through the YC/RGB signal conversion circuit 107, resulting in the production of the non-interlaced R, G and B signals from the output terminals 108, 109 and 110, respectively. On the other hand, in the case of the embodiment shown in FIG. 33, conversion to the RGB signals through the YC/RGB conversion circuit 107 is followed by the interlaced/non-interlaced signal conversion through the circuit 103, resulting in that the non-interlaced R, G and B signals are produced from the output terminals 108, 109 and 110, respectively. The enhancement circuits 103 and 115 will be described in detail hereinafter.

According to the embodiments shown in FIGS. 28, 32 and 33, a picture image less susceptible to dot interference and interlacing interference can be produced because the magnitude or level of enhancement is decreased only when no vertical correlation is detected in the motion picture susceptible to the dot interference and interlace interference.

Figure 34:
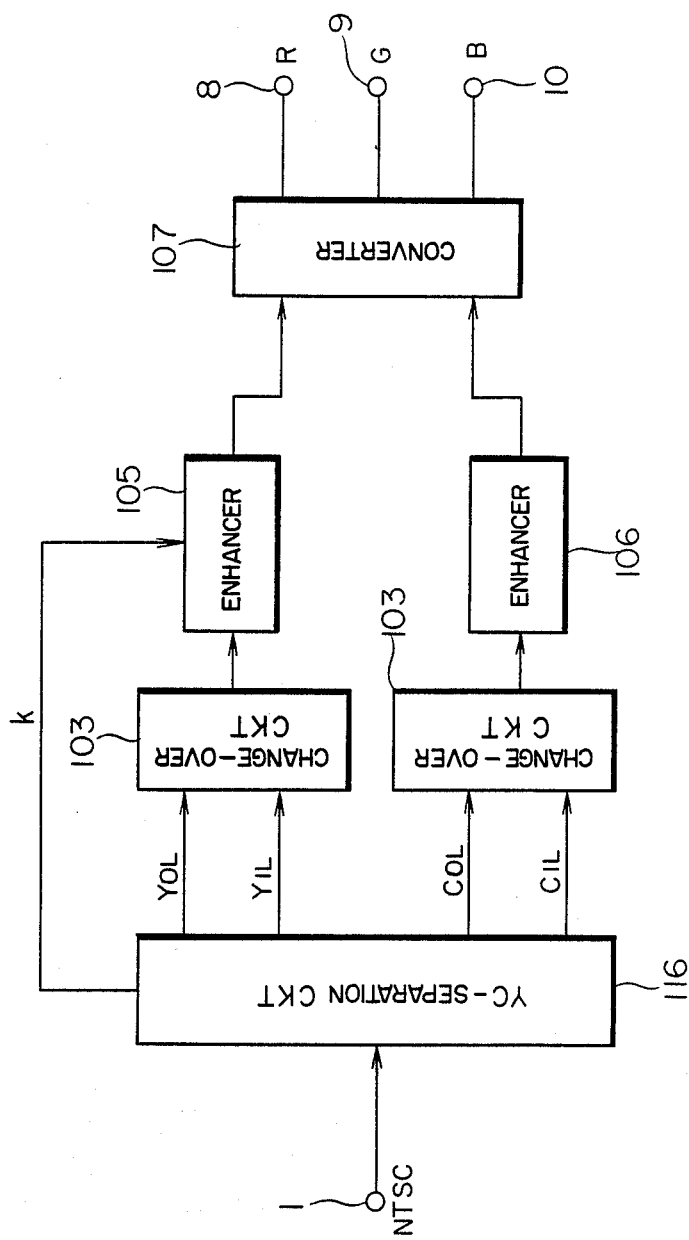
Figure 35:
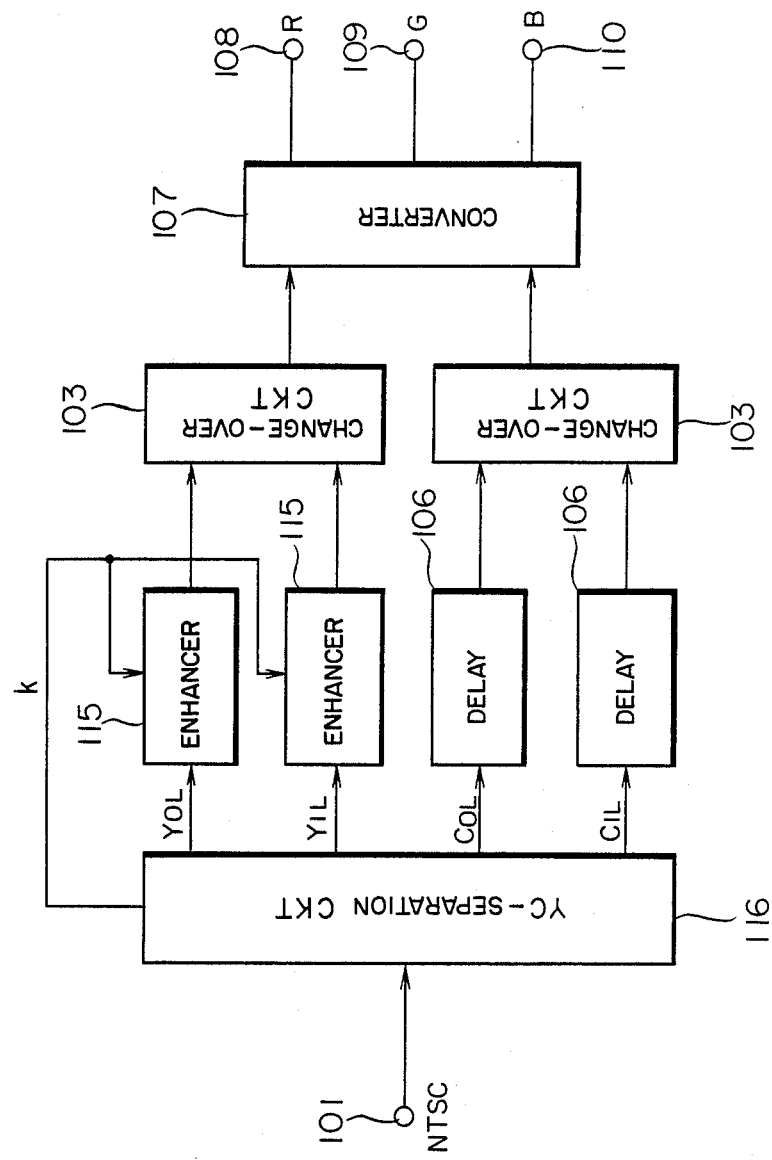
Figure 36:
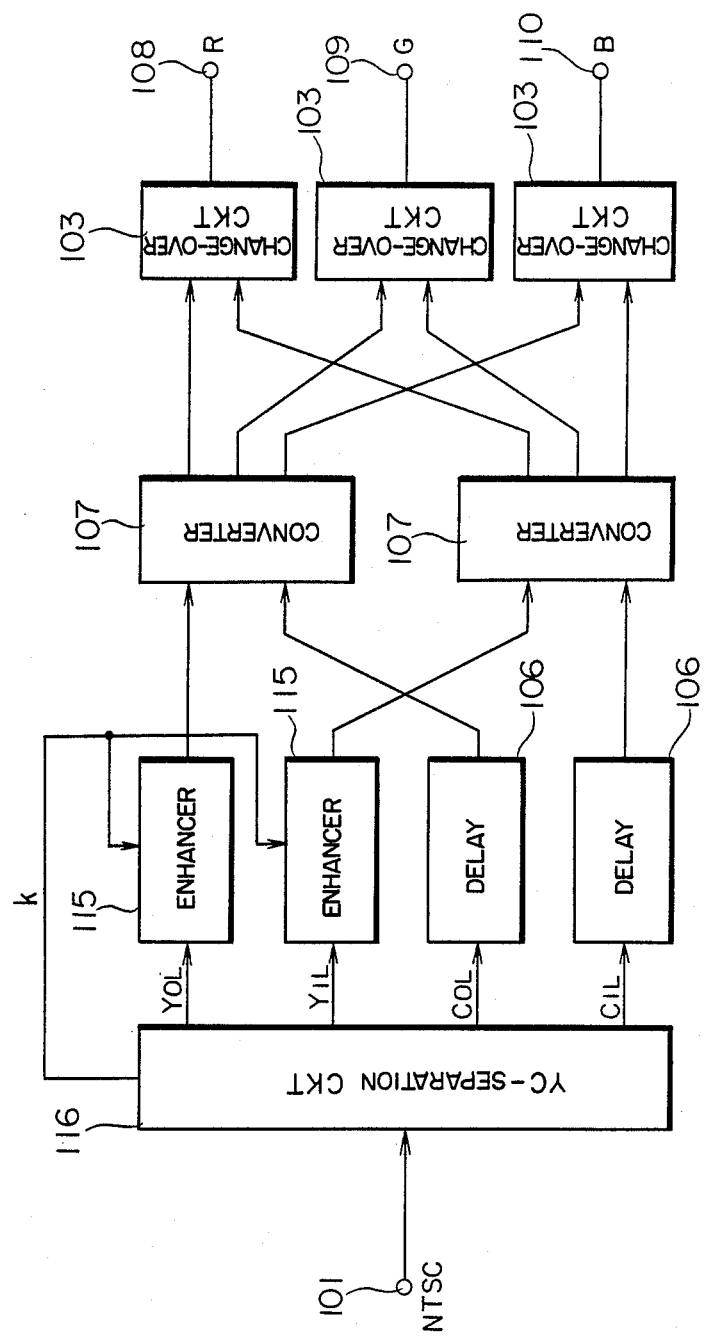

FIGS. 34, 35 and 36 show other embodiments of the enhance circuit. In these figures, reference numerals 101, 103, 104, 105, 106, 107, 108, 109, 110 and 115 designate same or like circuits or elements as those described above with reference to FIGS. 28, 32 and 33. A reference numeral 116 denotes a YC-separation circuit which incorporates a frame memory and a motion detecting circuit and in which YC-separation is performed through the time-axis filter for a still picture, while YC-separation is performed through the vertical-axis filter for a motion picture. Further, symbols k, $Y_{0L}$, $Y_{1L}$, $C_{0L}$ and $C_{1L}$ represents the same quantities as those described in conjunction with the embodiments shown in FIGS. 28, 32 and 33. The embodiments shown in FIGS. 34, 35 and 36 operate in the manner mentioned below. An NTSC television signal is inputted to the YC-separation circuit 116, whereby the motion magnitude k, the luminance signals $Y_{0L}$, $Y_{1L}$ and the color difference signals $C_{0L}$, $C_{1L}$ are obtained. In the case of the embodiment shown in FIG. 34, the luminance signal and the color difference signal are non-interlaced signals derived through the interlaced/non-interlaced signal conversion circuit 103. The enhancer circuit 105 serves to emphasize the high frequency components (contour component) of the luminance signal. At that time, the level of emphasis (magnitude of enhancement) is changed over in dependence on the value of k. More specifically, magnitude of enhancement is set at minimum when k=1 and is gradually increased as k approaches zero. The delay circuit 106 serves to match the signals Y and C in timing. The YC-signals are converted to RGB-signals through the YC/RGB conversion circuit 107, as the result of which non-interlaced R, G and B signals are derived from the output terminals 108, 109 and 110, respectively, of the circuit 107. In the case of the embodiments shown in FIGS. 32 and 33, enhancement of the signals is carried out before conversion into the noninterlaced signals. In other words, the luminance signals $Y_{0L}$ and $Y_{1L}$ are separately enhanced through the enhancer circuit 115. The magnitude of enhancement can be changed over in dependence on the value of k. As in the case of the embodiment shown in FIG. 34, enhancement is made minimum when k=1 and is gradually increased as k approaches zero. The delay circuit 106 serves to match the signals Y and C in the timing. In the case of the embodiment shown in FIG. 35, the interlaced/non-interlaced signal conversion circuit 103 outputs the non-interlaced Y and C signals which are subsequently converted to RGB-signals through the YC/RGB signal conversion circuit 107, resulting in the production of the non-interlaced R, G and B signals from the output terminals 108, 109 and 110, respectively. On the other hand, in the case of the embodiment shown in FIG. 36, conversion to the RGB signals through the YC/RGB conversion circuit 107 is followed by the interlaced/non-interlaced signal conversion through the circuit 103, resulting in that the non-interlaced R, G and B signals are produced from the output terminals 108, 109 and 110, respectively.

According to the embodiments shown in FIGS. 34, 35 and 36, a motion picture image which is less susceptible to dot interference and interlace interference can be produced while a still picture image can be produced with high resolution because of intensified enhancement.

Figure 37:
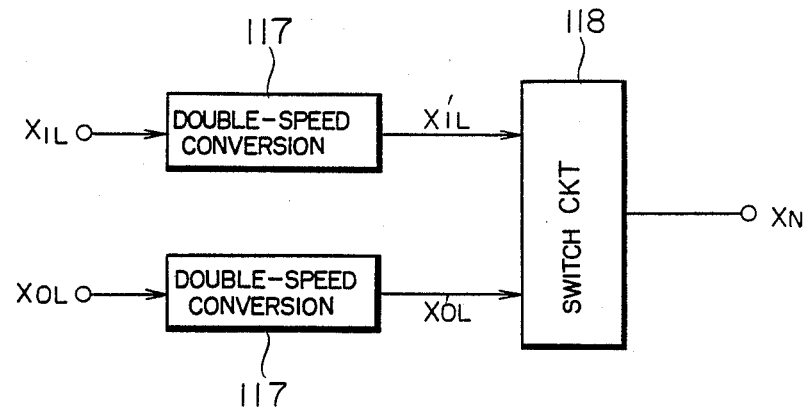
FIG. 37 is a block diagram showing an exemplary circuit arrangement of an interlaced/non-interlaced signal conversion circuit.
Figure 38:
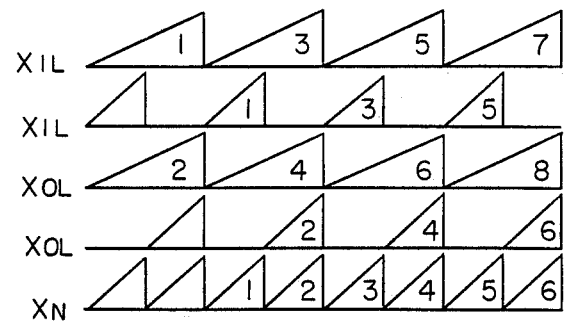
FIG. 38 is a timing diagram for illustrating operation of the interlaced/non-interlaced signal conversion circuit.

Next, description will be made on the interlaced/non-interlaced signal conversion circuit 103. An exemplary circuit arrangement of the interlaced/non-interlaced signal conversion circuit 103 is shown in FIG. 37, in which reference numeral 17 denote double-speed conversion circuit, and 118 denotes a switch circuit. A symbol $X_{0L}$ represents the signal component $Y_{0L}$ or $C_{0L}$, a symbol $X_{1L}$ represents $Y_{1L}$ or $C_{1L}$, and a symbol $X_N$ represents the non-interlaced Y or C signal resulting from the interlaced/non-interlaced signal conversion. FIG. 38 shows a timing diagram for illustrating operation of the interlaced/non-interlaced signal conversion circuit.

Figure 39:
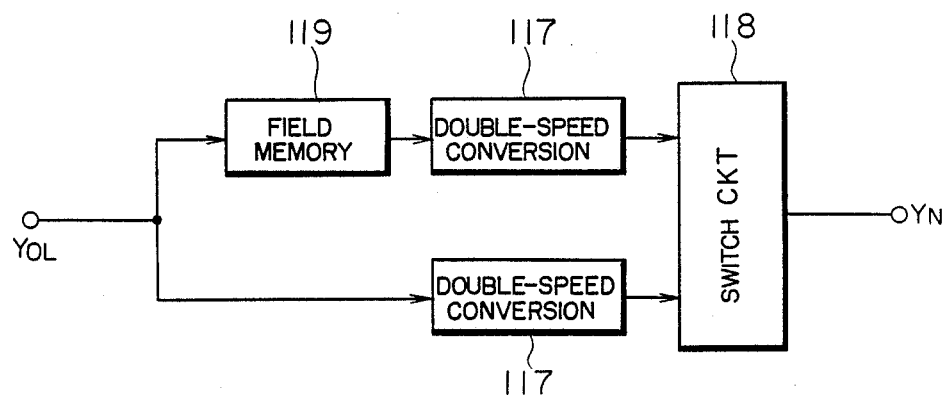
FIGS. 39 and 40 are block diagrams showing other exemplary configurations of the interlaced/non-interlaced signal conversion circuit.

In the exemplary embodiments shown in FIG. 28, 32 to 36, such a circuit arrangement can be adopted in which $Y_{1L}$ is not utilized but only $Y_{0L}$ is employed in carrying out the method of obtaining the interlaced/non-interlaced signal. Such modification of the interlaced/non-interlaced signal conversion circuit is shown in FIG. 39, in which a reference numeral 119 denotes a field memory.

Figure 40:
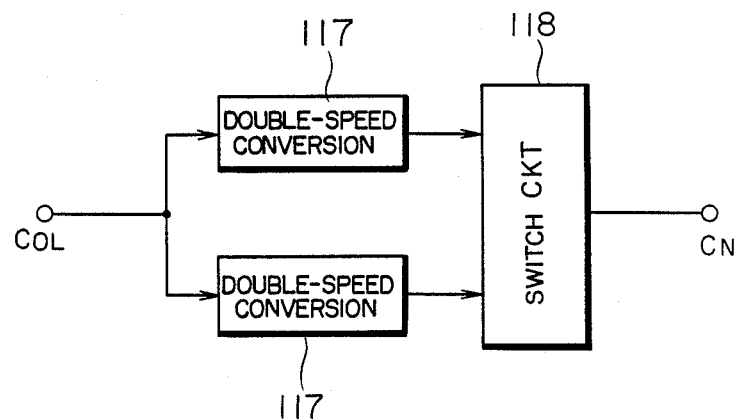

Similarly, the embodiments shown in FIGS. 28, 32 to 36 can be so modified that only $C_{0L}$ is employed with $C_{1L}$ being neglected for deriving the non-interlaced C-signal. An example of such modification of the interlaced/non-interlaced signal conversion circuit is shown in FIG. 40.

It goes without saying that the picture image scarcely undergone the dot interference and the interlacing interference can be obtained with high resolution.

Figure 41:
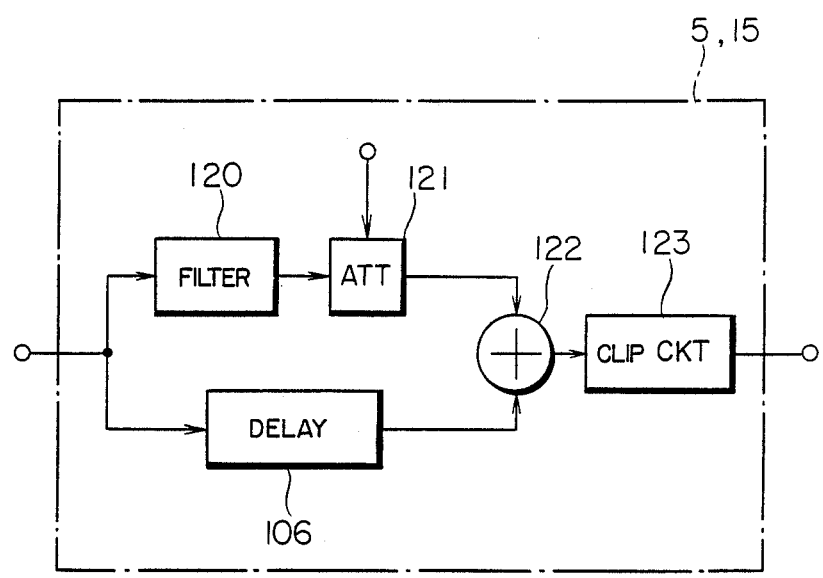
FIG. 41 is a block diagram showing an exemplary arrangement of an enhancement circuit.
Figure 42:
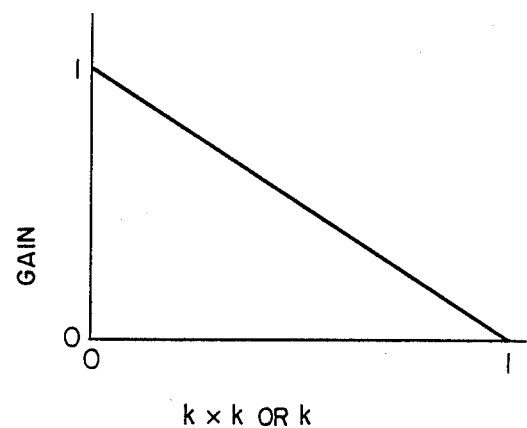
FIG. 42 is a view for graphically illustrating an operation characteristic of an attenuator circuit.

Next, description will be made on the enhancer circuit 103 and 115. FIG. 41 shows an example of the enhancer circuit. In the figure, a reference numeral 120 denotes a filter for passing therethrough high-frequency signal components, 121 denotes an attenuator whose gain is changed in dependence on the control signal h×k or k, 122 denotes an adder, and 123 denotes a clip circuit. FIG. 42 illustrates graphically a relationship between gain of the attenuator 121 and the control signal, by way of example. The filter 120 passes through the two-dimensional high-frequency components including horizontal or vertical or horizontal and vertical axes. The frequency at which gain of the filter 120 becomes maximum is, for example, 3.58 MHz for the horizontal components, and 262.5 lines for the vertical components.

The embodiments of the enhancer circuit described above makes it possible to realize high resolution capability while suppressing adverse influence of the interference signals.

We claim:

1. A signal processing circuit in which a composite color television signal containing luminance signal (Y) and color difference signals (C) multiplexed in frequency is subjected to YC-signal separation, comprising: a frame memory for storing said composite color televison signal; vertical correlation detecting means for detecting the magnitude of vertical correlation of pictures by obtaining $|X_1-X_{-1}|$, $|X_1-X_0|$ and $|X_{-1}-X_0|$ on the basis of the three sequential scanning lines $X_{-1}$, $X_0$ and $X_1$ read out from said frame memory; a vertical-axis filter for performing the YC-signal separation through a filtering operation in the vertical direction; and an attenuator for attenuating the color difference signals having an atenuation factor varying in accordance with the magnitude of correlation determined by said vertical correlation detecting means.

2. A signal processing circuit for a composite color television signal according to claim 1, further comprising motion detecting means for detecting motion of a picture in response to the signal read out of said frame memory; and mixing means for mixing two input signals in accordance with the magnitude of the motion of said picture.

3. A signal processing circuit for a composite color television signal according to claim 1, further comprising motion detecting means for detecting the motion of a picture; a time-axis filter for performing YC-signal separation through filtering processing in the time-axis direction; and mixing means for mixing two input signals thereto in accordance with the motion of said picture.

4. A signal processing circuit in which a composite color television signal containing luminance signal (Y) and color difference signals (C) multiplexed in frequency is subjected to YC-signal sepration, comprising: a frame memory for storing said composite color television signal; vertical correlation detecting means for detecting the magnitude of vertical correlation of pictures on the basis of the signal read out from said frame memory; vertical-axis filter for performing YC-signal separation through a filtering operation in the vertical direction and having at least one output; a two-dimensional filter for performing YC-signal separation through a two-dimensional filtering processing in both horizontal and vertical directions and having at least one output; and mixing means for mixing the output signals of said two filters in accordance with the magnitude of the vertical correlation.

5. A signal processing circuit for a composite color television signal according to claim 4, further comprising motion detecting means for detecting the magnitude of motion of a picture in response to the signal read out from said frame memory; a time-axis filter for performing YC-signal separation through a filtering operation in the time-axis direction and having at least one output; and mixing means for mixing the signals at the outputs of said three filters in accordance with the magnitudes of said picture motion and vertical correlation.

6. A signal processing circuit for a composite color television signal, comprising:

YC-signal separating means for separating luminance signal (Y) and color difference signal (C), said YC-signal separation means including a frame memory for storing said composite color television signal, vertical correlation detecting means for detecting the magnitude of vertical correlation of pictures by obtaining $|X_1-X_{-1}|$, $|X_1-X_0|$ and $|X_{-1}-X_0|$ on the basis of the three sequential scanning lines $X_{-1}$, $X_0$ and $X_1$ read out from said frame memory; a vertical-axis filter for performing the YC-signal sepration through a filtering operation in the vertical direction; and an attenuator for attenuating the color difference signals having an attenuation factor varying in accordance with the magnitude of correlation determined by said vertical correlation detecting means;

filter means for extracting high-frequency components in the horizontal direction or vertical direction or in a two-dimensional plane including the horizontal and vertical axes;

motion detecting means for detecting the magnitude of motion of a picture in response to the signal read out from said frame memory;

an attenuator having a gain which is controlled by the magnitude of said motion; and an adder.

7. A signal processing circuit for a composite color television signal, comprising:

YC-signal separating means for separating luminance signal (Y) and color difference signal (C), said YC-signal separation means including a frame memory for storing said composite color television signal, vertical correlation detecting means for detecting the magnitude of vertical correlation of pictures by obtaining $|X_1-X_{-1}|$, $|X_1-X_0|$ and $|X_{-1}-X_0|$ on the basis of the three sequential scanning lines $X_{-1}$, $X_0$ and $X_1$ read out from said frame memory; a vertical-axis filter for performing the YC-siganl separation through a filtering operation in the vertical direction; and an attenuator for attenuating the color difference signals having an attenuation factor varying in accordance with the magnitude of correlation determined by said vertical correlation detecting means;

filter means for extracting high-frequency components in the horizontal direction or vertical direction or in a two-dimensional plane including the horizontal and vertical axes;

motion detecting means for detecting the magnitude of motion of a picture f in response to the signal read out from said frame memory;

an attenuator having a gain which is controlled by the magnitude of said motion and/or magnitude of said vertical correlation; and an adder.

8. A signal processing circuit for a composite color television signal, comprising:

YC-signal separation means for separating luminance signal (Y) and color difference signal (C), said YC-signal separation means including a frame memory for storing said composite color television signal, motion detecting means for detecting the magnitude of motion of a picture image in response to the signal read out from said frame memory, vertical correlation detecting means for detecting the magnitude of vertical correlation of pictures in response to the signal read out from said frame memory, a vertical-axis filter for performing YC-signal sepration through a filtering operation in the vertical-axis direction and having at least one output, a time-axis filter for performing a filtering operation in the time-axis direction and having at least one output, a two-dimensional filter for performing YC-signal separation through a filtering operation in both the horizontal and vertical directions and having at least one output, and mixing means for mixing the outputs of said three filters in accordance with said magnitude of motion and said magnitude of vertical correlation;

filter means for extracting high-frequency components in the horizontal direction or vertical direction or in a two-dimensional plane including the horizontal and vertical axes;

an attenuator having a gain which is controlled by the magnitude of said motion; and an adder.

9. A signal processing circuit for a composite color television signal, comprising:

YC-signal separation means for separating luminance signal (Y) and color difference signal (C), said YC-signal separation means including a frame memory for storing said composite color television signal, motion detecting means for detecting the magnitude of motion of a picture image in response to the signal read out from said frame memory, vertical correlation detecting means for detecting the magnitude of vertical correlation of pictures in response to the signal read out from said frame memory, a vertical-axis filter, having at least one output, for performing YC-signal separation through a filtering operation in the vertical-axis direction, a time-axis filter, having at least one output, for performing a filtering operation in the time-axis direction, a two-dimensional filter, having at least one output, for performing YC-signal separation through a filtering operation in both the horizontal and vertical directions, and mixing means for mixing the outputs of said three filters in accordnace with said magnitude of motion and said magnitude of vertical correlation;

filter means for extracting high-frequency components in the horizontal direction or vertical direction or in a two-dimensional plane including the horizontal and verticl axes;

an attenuator having a gain which is controlled by the magnitude of said motion and/or magnitude of said vertical correlation; and an adder.

* * * * *